US012716521B2

(12) United States Patent
Lovell et al.

(10) Patent No.: US 12,716,521 B2
(45) Date of Patent: *Aug. 25, 2026

(54) PACKING SYSTEM OF A VALVE ASSEMBLY

(71) Applicant: Fisher Controls International LLC, Marshalltown, IA (US)

(72) Inventors: Michel Ken Lovell, Marshalltown, IA (US); Trenton F. Jackson, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 27 days.

This patent is subject to a terminal disclaimer.

(21) Appl. No.: 19/021,048

(22) Filed: Jan. 14, 2025

(65) Prior Publication Data

US 2025/0155052 A1 May 15, 2025

Related U.S. Application Data

(63) Continuation of application No. 18/447,925, filed on Aug. 10, 2023, now Pat. No. 12,234,926.

(51) Int. Cl.

| | |
|---|---|
| ***F16K 41/04*** | (2006.01) |
| ***F16J 15/18*** | (2006.01) |
| ***F16K 3/24*** | (2006.01) |
| ***F16K 37/00*** | (2006.01) |
| ***F16K 41/00*** | (2006.01) |
| ***F16K 41/02*** | (2006.01) |
| ***F16K 41/06*** | (2006.01) |

(52) U.S. Cl.

CPC ........... *F16K 41/003* (2013.01); *F16J 15/183* (2013.01); *F16J 15/185* (2013.01); *F16K 3/243* (2013.01); *F16K 37/0091* (2013.01); *F16K 41/02* (2013.01); *F16K 41/04* (2013.01); *F16K 41/06* (2013.01)

(58) Field of Classification Search

CPC .... F16K 41/003; F16K 3/243; F16K 37/0091; F16K 41/02; F16K 41/04; F16K 41/06; F16J 15/183; F16J 15/185

USPC .................................................. 251/214, 355

See application file for complete search history.

(56) References Cited

U.S. PATENT DOCUMENTS

| | | | |
|---|---|---|---|
| 4,177,998 | A | 12/1979 | Laitkep |
| 4,505,115 | A | 3/1985 | Arbuckle |
| 4,886,241 | A | 12/1989 | Davis |
| 4,922,719 | A | 5/1990 | Arbuckle |

(Continued)

*Primary Examiner* — John Bastianelli

(74) *Attorney, Agent, or Firm* — Quarles & Brady LLP

(57) ABSTRACT

A packing system is disclosed for use with a valve having a valve body that defines a flow passage therethrough. The packing system includes a bonnet configured for connection to the valve body, a stem bore extending through the bonnet to receive a stem of the valve that is movable within the stem bore to control flow through the flow passage, a first packing set arranged in the stem bore surrounding a first portion of the stem, a second packing set arranged in the stem bore surrounding a second portion of the stem that is spaced apart from the first packing set by a support ring to define an inter-packing volume within the stem bore, and a pressurized barrier lubricant reservoir in communication with the inter-packing volume via a bonnet port in the bonnet to pressurize barrier lubricant within the inter-packing volume to be at or above a process pressure.

9 Claims, 9 Drawing Sheets

(56) References Cited

U.S. PATENT DOCUMENTS

| | | | |
|---|---|---|---|
| 5,056,757 | A | 10/1991 | Wood |
| 5,056,758 | A | 10/1991 | Bramblet |
| 5,249,812 | A | 10/1993 | Volden et al. |
| 5,593,166 | A | 1/1997 | Lovell |
| 5,607,165 | A | 3/1997 | Bredemeyer |
| 5,746,435 | A | 5/1998 | Arbuckle |
| 5,791,629 | A | 8/1998 | Wears |
| 6,161,835 | A | 12/2000 | Arbuckle |
| 6,763,703 | B2 | 7/2004 | Krieger |
| 7,059,418 | B2 | 6/2006 | Greeb et al. |
| 7,118,114 | B2 | 10/2006 | Burdick |
| 8,074,999 | B2 | 12/2011 | Burdick et al. |
| 9,528,631 | B2 | 12/2016 | McCarty |
| 10,359,113 | B2 | 7/2019 | Bergamini |
| 2004/0227302 | A1 | 11/2004 | Burdick et al. |
| 2013/0061954 | A1* | 3/2013 | Giove .................. F16J 15/3296 137/487.5 |

* cited by examiner 300
320
310
PACKING DIFFERENTIAL PRESSURE (PSID)
PROCESS PRESSURE
2500
2000
1500
1000
500
0
-500
-1000
-1500
-2000
-2500
0
200
400
600
800
1000
1200
1400
1600

514
500
502
522
532
516
526
530
536
520
534
504
528
L
478
506
476
510
408
106
410
440
408
454
442
P2
438
446
402
432
$P_{ATM}$ 1164
1168
CONTROLLER
1162
1166
1160

1100a
1126a
1040
1116a
L
1054b
1008
1076a
P6
1076c
1084
1078a
106
1082
P5
1042b
P4
1076b
L
1116b
1100b
1042a
1054a
1038
1042c
1054c
1002
1078b
1032
$P_{ATM}$

PACKING SYSTEM OF A VALVE ASSEMBLY

CROSS-REFERENCE TO RELATED APPLICATIONS

This application is a continuation of U.S. non-provisional application Ser. No. 18/447,925, filed Aug. 10, 2023, which is incorporated herein by reference.

BACKGROUND

Valve assemblies, including control valves, can be used in a wide variety of applications including process plants such as refineries, chemical plants, and paper plants, among many others. In some applications, a packing system of a control valve can help to limit fugitive emissions from the packing system. For example, arrangements of packing material can surround a valve stem of a control valve to help prevent leakage of process fluid past the valve stem to the ambient environment.

SUMMARY

Generally, some examples disclosed herein can provide a packing system for use with a valve including a valve body having an inlet, an outlet, and a flow passage extending between the inlet and the outlet. The packing system can include a bonnet configured for connection to the valve body, a stem bore extending through the bonnet to open into the valve body to receive a stem of the valve such that the stem is movable within the stem bore to control flow through the flow passage, a first packing set arranged in the stem bore to surround a first portion of the stem, a second packing set arranged in the stem bore to surround a second portion of the stem, and a pressurized barrier lubricant reservoir. The first packing set can be arranged between the second packing set and the valve body, and with the second packing set spaced apart from the first packing set by a support ring to define an inter-packing volume within the stem bore. The pressurized barrier lubricant reservoir can be in fluid communication with the inter-packing volume via a bonnet port in the bonnet to pressurize barrier lubricant within the inter-packing volume to be at or above a first pressure.

In some examples, the pressurized barrier lubricant reservoir can be secured to the bonnet at the bonnet port.

In some examples, the pressurized barrier lubricant reservoir can be arranged to sense a process pressure at a location that is upstream of the first packing set, relative to a leakage flow path from the flow passage through the stem bore, to pressurize the barrier lubricant to be above the process pressure. In some such examples, the pressurized barrier lubricant reservoir can include a spring-biased piston arranged to compress a barrier lubricant chamber, an outlet port arranged to connect the barrier lubricant chamber to the bonnet port, and a process port plumbed to the process pressure to assist the spring-biased piston, with the process port fluidically isolated from the barrier lubricant chamber.

In some examples, the bonnet port can be a first bonnet port, the pressurized barrier lubricant reservoir can be a first pressurized barrier lubricant reservoir, the support ring can be a first support ring, the inter-packing volume can be a first inter-packing volume, and the packing system can further include a third packing set and a second pressurized barrier lubricant reservoir. The third packing set can be arranged in the stem bore to surround a third portion of the stem and spaced apart from the second packing set by a second support ring to define a second inter-packing volume within the stem bore, with the third packing set between the first packing set and the second packing set. The second pressurized barrier lubricant reservoir can be in fluid communication with the second inter-packing volume via a second bonnet port in the bonnet to pressurize barrier lubricant within the second inter-packing volume to be at or above a second pressure that is higher than the first pressure. In some such examples, the second pressurized barrier lubricant reservoir can be arranged to sense a process pressure upstream of the first packing set, relative to a leakage flow path from the flow passage through the stem bore, to pressurize barrier lubricant within the second pressurized barrier lubricant reservoir to be above the process pressure. In other such examples, the packing system can further include a fourth packing set and a booster system. The fourth packing set can be arranged in the stem bore to surround a fourth portion of the stem and spaced apart from the first packing set by a third support ring to define a third inter-packing volume within the stem bore, with the fourth packing set between the first packing set and the valve body. The booster system can be arranged to pressurize process fluid from upstream of the fourth packing set, relative to a leakage flow path from the flow passage through the stem bore, and to provide the pressurized process fluid to the third inter-packing volume via a third bonnet port in the bonnet.

In some examples, the packing system can further include a sensor arrangement that can be configured to sense a flow of barrier lubricant to the bonnet port and a control system that can be configured to determine a leakage of barrier lubricant out of the inter-packing volume.

Some examples of the present disclosure provide a valve assembly for a process flow at a process pressure. The valve assembly can include a valve body, a bonnet, a stem, a first packing set, a second packing set, and a bonnet port. The valve body can include an inlet, an outlet, and a flow passage extending between the inlet and the outlet to guide the process flow. The bonnet can be mounted to the valve body and can have a stem bore that opens into the valve body. The stem can extend through the stem bore and can operatively connect to a control member arranged in the flow passage. The stem can be configured to move the control member between a closed position and an open position to control flow through the flow passage. The first packing set can be arranged in the stem bore about a first portion of the stem. The second packing set can be arranged in the stem bore about a second portion of the stem, downstream of the first packing set, relative to a leakage flow path from the flow passage through the stem bore, to provide an inter-packing volume within the stem bore between the first packing set and the second packing set. The bonnet port can extend through the bonnet to provide fluid communication between the inter-packing volume and a pressurized fluid source at a first pressure that is higher than the process pressure.

In some examples, the pressurized fluid source can be a pressurized barrier lubricant reservoir. In some such examples, the pressurized barrier lubricant reservoir can be plumbed to the stem bore upstream of the first packing set, relative to the leakage flow path, to pressurize barrier lubricant within the pressurized barrier lubricant reservoir above the process pressure.

In some examples, the bonnet port can be a first bonnet port, the pressurized fluid source can be a first pressurized fluid source, the inter-packing volume can be a first inter-packing volume, and the valve assembly can further include a third packing set and a second bonnet port. The third packing set can be arranged in the stem bore about a third portion of the stem that can be downstream of the second packing set along the leakage flow path to define a second inter-packing volume within the stem bore between the second packing set and the third packing set. The second bonnet port can extend through the bonnet to provide fluid communication between the second inter-packing volume and a second pressurized fluid source at a second pressure that is higher than the first pressure. In some such examples, the second pressurized fluid source can be a pressurized barrier lubricant reservoir. In some such examples, the pressurized barrier lubricant reservoir can be plumbed to the stem bore upstream of the first packing set, relative to the leakage flow path, to pressurize barrier lubricant within the pressurized barrier lubricant reservoir above the process pressure. In other such examples, the valve assembly can further include a fourth packing set and a booster system. The fourth packing set can be arranged in the stem bore about a fourth portion of the stem that can be upstream of the first packing set along the leakage flow path to define a third inter-packing volume within the stem bore, with the fourth packing set between the first packing set and the valve body. The booster system can be arranged to pressurize process fluid from upstream of the fourth packing set, relative to the leakage flow path, and provide the pressurized process fluid to the third inter-packing volume via a third bonnet port in the bonnet. In some such examples, the booster system can include a pneumatically powered pump that can be arranged to pressurize the process fluid.

In some examples, the valve assembly can further include a sensor arrangement that can be configured to sense a flow of fluid through the bonnet port.

Some examples of the present disclosure provide a packing system for use with a valve assembly that includes a valve body having an inlet, an outlet, and a flow passage extending between the inlet and the outlet, and a bonnet having a stem bore that receives a valve stem to control flow through the flow passage. The packing system can include a first packing set, a second packing set, and barrier lubricant. The first packing set can be in the stem bore about a first portion of the stem and can be compressed to provide a first pressure drop along a leakage flow path from the flow passage through the stem bore. The second packing set can be in the stem bore about a second portion of the stem that can be downstream of the first packing set relative to the leakage flow path to provide a first inter-packing volume within the stem bore between the first packing set and the second packing set. The second packing set can be compressed to provide a second pressure drop along the leakage flow path larger than the first pressure drop. The barrier lubricant can be pressurized to a first pressure within the first inter-packing volume.

In some examples, the packing system can further include a third packing set in the stem bore about a third portion of the stem, the third packing set being downstream of the second packing set relative to the leakage flow path, to provide a second inter-packing volume within the stem bore between the second packing set and the third packing set, and compressed to provide a third pressure drop along the leakage flow path larger than the second pressure drop. In some such examples, the packing system can further include barrier lubricant pressurized to a second pressure within the second inter-packing volume, the second pressure being higher than the first pressure.

BRIEF DESCRIPTION OF THE DRAWINGS

The accompanying drawings, which are incorporated in and form a part of this specification, illustrate examples of the disclosed technology and, together with the description, serve to explain the principles of the disclosed technology.

DETAILED DESCRIPTION

Figure 1:
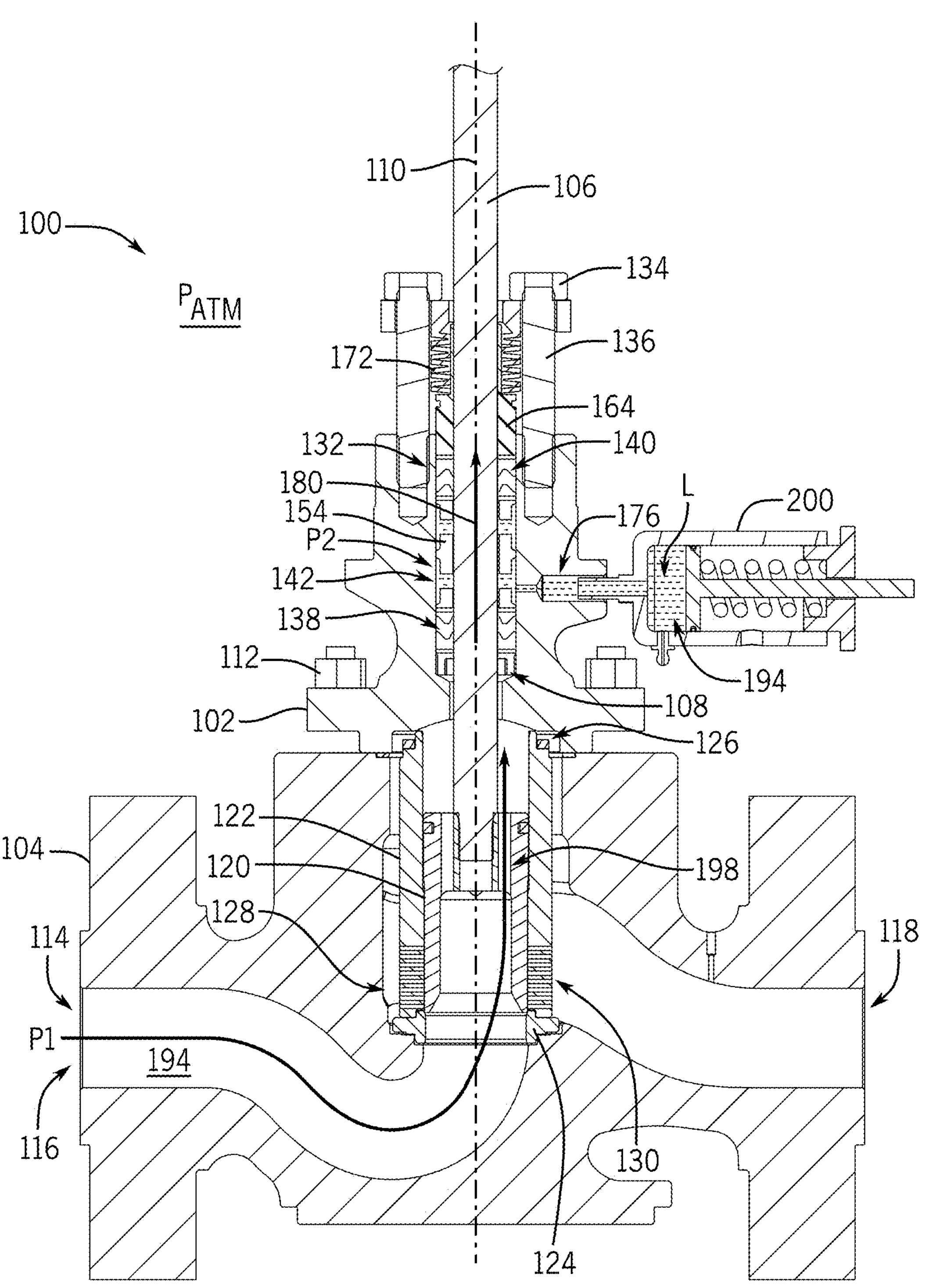
FIG. 1 is a cross-sectional partly schematic view of an example valve assembly with a packing system, in accordance with principles of the present disclosure.

The following discussion is presented to enable a person skilled in the art to make and use examples of the disclosed technology. Various modifications to the illustrated examples will be readily apparent to those skilled in the art, and the generic principles herein can be applied to other examples and applications without departing from disclosed technical principles. Thus, the disclosed technology is not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of the disclosed technology. Skilled artisans will recognize the examples provided herein have many useful alternatives and fall within the scope of this disclosure as a whole.

Before any examples are explained in detail, it is to be understood that the present disclosure is not limited in its application to the details of construction and the arrangement of components set forth in the following description or illustrated in the attached drawings. The disclosed technology is capable of other configurations and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items. The use of "about" or "approximately" and variations thereof herein is meant to refer to variation in the numerical quantity that may occur, for example, through the measuring of pressures or temperatures within various portions of a valve assembly that may include examples of the disclosure herein; through inadvertent error in these procedures; through differences in the accuracy or precision of various components used to carry out the methods; and the like. Throughout the disclosure, the terms "about" and "approximately" are intended to refer to a range of values ±5% of the numeric value that the term proceeds, inclusive.

As briefly discussed above, valve assemblies can be used to control flowrate for a process fluid flowing from a fluid source toward a downstream application. A valve assembly, for example, can have a main valve inlet and a main valve outlet. A main flow passage can extend between the main valve inlet and the main valve outlet and through a main valve body. The main valve body can include a control member, such as a valve plug or a valve disc, for example, to manipulate a process fluid flowing through a pipeline, such as a steam, water, natural gas, oil, or other chemical compounds. The control member is typically moved by an operating member, such as a sliding valve stem or a rotary shaft, that extends through a bore in the valve body. To prevent leakage or fugitive emissions of the process fluid around the operating member, a packing arrangement is typically disposed about the operating member in the bore of the valve body.

Many process applications, including those involving aromatic or chlorinated hydrocarbons, utilize control valves that tend to leak small amounts of process fluid into the surrounding environment (i.e., produce fugitive emissions). Conventional solutions to reduce fugitive emissions involve placing a metal bellows seal around the operating member to capture process leakage or exerting compressive stress on packing material to create a tight seal between the operating member and the valve body bore. However, these solutions can have undesirable effects on the operation and performance of the control valve. For instance, increasing the packing stress tends to increase the friction experienced by the operating member (e.g., a sliding valve stem). The increased friction impedes movement of the operating member, which can in turn make it difficult to monitor and control the position of the operating member. Higher levels of friction also may necessitate a larger actuator, which can increase the operating and manufacturing costs associated with the control valve. Further, increased friction can accelerate degradation of packing material, and thus require more frequent maintenance to prevent unwanted emissions. And, in any case, conventional dynamic seals with pressurized trim (e.g., stem packing seals on sliding stem control valves and shaft packing seals on rotary control valves), may still allow some levels of fugitive emissions to be released from control valves.

As an alternative, metal bellows seals are commonly utilized for applications that require minimal leakage of process fluid to atmosphere (e.g., involving hazardous process fluid). Metal bellows sealing systems can provide significantly reduced leakage rates compared to dynamic seals (e.g., below $1\times10^{-6}$ cubic centimeter per second (cc/sec)). Conventional metal bellows sealing systems are commonly arranged in a stem bore with the metal bellows replacing the dynamic seal around the sliding stem as the primary seal and are sealed with a static gasket. However, when a metal bellows fails due to wear, fugitive emissions immediately increase by orders of magnitude. As such, a dynamic packing system is commonly utilized in conjunction with the metal bellows sealing system, downstream of the bellows along a leakage flow path through the stem bore, to provide an additional seal against fugitive emissions. However, such arrangements tend to be relatively expensive and require a relatively large bonnet to provide a stem bore with adequate length for both the metal bellows system and the dynamic packing system. Further, conventional bellows sealing systems typically can be utilized for only specific operating conditions (e.g., relatively low pressure) and in specific types of control valves (e.g., sliding stem valves with a relatively short stem stroke). In addition, as described above, the effectiveness of the dynamic packing system can also degrade over time and result in unacceptable levels of fugitive emissions when the metal bellows ultimately fails.

Examples of the disclosed technology can address these issues, including by providing a packing system of a valve assembly that provides sealing performance from a pressurized trim that is comparable to metal bellows systems (e.g., qualified under the International Organization for Standardization (ISO) standard 15848-2, Class A) but without various of the drawbacks of bellows system noted above. Some examples can provide improved sealing in this regard in a more compact package than conventional designs and in configurations that can be utilized in a wider range of operating conditions (e.g., high pressure, high temperature) and for a wider range of control valves (e.g., rotary valves, sliding stem valves with longer stem stroke, and large valve in which metal bellows systems are commonly impractical).

In some examples, a packing system for a valve assembly can utilize a barrier lubricant (e.g., grease or other liquid) between the process fluid and atmosphere to establish and maintain particular (e.g., distinct) pressure drops through different packing sets of the packing system. Some configurations can provide a valve assembly having a packing system including an upstream (e.g., first or lower) packing set and a downstream (e.g., second or upper) packing set that collectively define at least part of an inter-packing volume between the two packing sets. A port can extend through the valve assembly (e.g., through a bonnet thereof) and open into the inter-packing volume of the packing system. A pressurized fluid reservoir (e.g., a barrier lubricant or grease canister) can be in fluid communication with the inter-packing volume via the port, so as to pressurize the inter-packing volume. Thus, a pressure drop across the upstream packing set can be reduced and, as further detailed below, improved control of emissions can be implemented.

In some examples, a packing system including a pressurized barrier lubricant reservoir can be easily retrofitted into existing valve assemblies. For example, some existing valve assemblies have bonnets with pre-drilled lubrication ports that are in fluid communication with an inter-packing volume. In such cases, a canister can be placed in fluid communication with an inter-packing volume via a pre-existing lubrication port to provide pressurized barrier lubricant within the inter-packing volume. Thus, large numbers of in-field systems can be economically retrofit, in part because no on-site drilling may be needed. In other cases, however, a bonnet port for connection to a pressurized fluid source (e.g., barrier lubricant or grease canister or other reservoir) can be drilled or otherwise formed into an existing bonnet of a valve assembly on-site or during manufacture.

Some examples can provide increased sealing performance along with reduced wear on the packing sets, including while maintaining elevated pressure differentials across an upper packing set. For example, some exemplary implementations provide a packing system configured to provide a barrier lubricant pressure within the inter-packing volume that varies with the process pressure. In some examples, a canister chamber of a canister (or other reservoir) is in fluid communication with a process pressure via a process passageway through the bonnet. The process pressure within the canister chamber in addition to a piston spring of the canister can provide a barrier lubricant pressure within the inter-packing volume that is tied to the process pressure (e.g., to provide to a bonnet port a fluid pressure that is increased or otherwise offset from the process pressure by a constant or variable value, across a range of process pressures). In some examples, a spring or other biasing element can be selected to supplement pressure of a process fluid according to the compression/extension of the spring (or other energization/relaxation of another biasing element), to provide a particular pressure drop across packing sets on opposing sides of the corresponding inter-packing volume. This control over differential pressure, via control of the barrier lubricant pressure, can help to optimize (e.g., minimize) differential pressure across both packing sets while providing improved sealing performance with a lower packing stress applied to the packing sets, which can help maximize the life and sealing performance of the packing sets.

Leakage of barrier lubricant from the inter-packing volume of the packing system to atmosphere may be undesirable in some applications. Accordingly, in some examples, a packing system can be configured to prevent leakage of barrier lubricant through the downstream packing set to atmosphere in addition to controlling fugitive emissions from the packing system. In some cases, a packing system can be configured to implement reverse pressure drops through packings sets of the packing system (i.e., reversed relative to the pressure drop for flow in the leakage direction of conventional packing systems). Accordingly, flow of barrier lubricant can be directed inward toward the process fluid rather than along a leakage path to atmosphere. In some examples, a packing system can include a first (e.g., lower) packing set, a second (e.g., middle) packing set, and a third (e.g., upper) packing set with the lower and middle packing sets defining a first (e.g., lower) inter-packing volume and the middle and upper packing sets defining a second (e.g., upper) inter-packing volume. A first pressure reservoir (i.e., barrier lubricant reservoir or canister) can be in fluid communication with the first inter-packing volume and the process pressure, and a second pressure reservoir can be in fluid communication the second inter-packing volume and the process pressure. The second pressure reservoir can be configured to provide a second barrier lubricant pressure that is greater than a first barrier lubricant pressure provided by the first pressure reservoir, which can result in potential leakage of barrier lubricant within the second inter-packing volume to be directed upstream (relative to normal leakage flow) to the first inter-packing volume.

In some applications, potential process contamination resulting from leakage of barrier lubricant into process fluid may also (or alternatively) be undesirable. Accordingly, in some examples, a packing system can be configured to greatly reduce or even eliminate process contamination that would otherwise result from leakage of barrier lubricant from the packing system into the process fluid. For example, some configurations can pressurize process fluid into an upstream inter-packing volume along a potential leakage path, so that process fluid rather than barrier lubricant can leak back into the process flow. Various downstream packing arrangements can then be used to prevent leakage from the upstream inter-packing volume (with pressurized process fluid), including as variously discussed above and below.

In some particular examples, a packing system can include a first (e.g., lower) packing set, a second (e.g., middle-lower) packing set, a third (e.g., middle-upper) packing set, and a fourth (e.g., upper) packing set that define a first (e.g., lower) inter-packing volume, a second (e.g., middle) inter-packing volume, and a third (e.g., upper) inter-packing volume. A first pressure reservoir (e.g., a low-pressure barrier lubricant reservoir or canister) can be in fluid communication with the second inter-packing volume and the process pressure to provide a first barrier lubricant pressure, and a second pressure reservoir (e.g., a high-pressure barrier lubricant reservoir or canister) can be in fluid communication the third inter-packing volume and the process pressure to provide a second barrier lubricant pressure greater than the first barrier lubricant pressure. A pump can be in fluid communication with the first inter-packing volume and the process flow to provide process fluid at an elevated pressure to the first inter-packing volume. The first pressure reservoir can provide pressurized fluid to the second inter-packing volume at a lower pressure than the pressure of the process fluid in the first inter-packing volume. Further, the second pressure reservoir can provide pressurized fluid to the third inter-packing volume at a higher pressure than is provided in the second inter-packing volume. Thus, leakage of the pressurized process fluid from the first inter-packing volume can proceed in both directions along the leakage flow path (i.e., upstream to the process flow and downstream to the second inter-packing volume). Thus, for example, leakage of the barrier lubricant from second inter-packing volume into the process flow can be entirely prevented and fugitive emissions from the first inter-packing volume can be effectively remedied by the pressurized second and third inter-packing volumes. Further, any process fluid leakage from the first inter-packing set though the first packing set to the process flow can generally be returned to the bonnet by the pump.

Examples of the disclosed technology can also provide a packing system of a valve assembly having a packing diagnostic system including to indicate that the packing system (or one or more packing sets thereof) requires maintenance or needs to be replaced. For example, a packing diagnostic system can be configured to evaluate the sealing performance or other health indicators for a packing system (or of one or more packing sets of the packing system) by monitoring levels of barrier lubricant within one or more inter-packing volumes of the packing system. In some examples, a packing diagnostic system can indicate a maximum threshold barrier lubricant volume that accumulates within one or more pressure reservoirs of the packing system that results from barrier lubricant leakage from a different inter-packing volume. Or a packing diagnostic system can indicate a minimum threshold barrier lubricant volume within an inter-packing volume that results from barrier lubricant leakage from that particular inter-packing volume. In some examples, a packing diagnostic system can be configured to monitor a pump duty cycle or other characteristic of a pump of the packing system that is configured to provide a pump pressure to one or more inter-packing volumes of the packing system.

Examples of the disclosed technology can also provide a method for retrofitting a packing system of a valve assembly, including a packing system as described above. For example, the method can include placing a pressure reservoir with pressurized barrier lubricant in fluid communication with an inter-packing volume of the valve assembly. Some existing valve assemblies have bonnets with pre-drilled lubrication ports that are in fluid communication with an inter-packing volume. Thus, in such cases, a pressure reservoir (or other reservoir) can be placed in fluid communication with an inter-packing volume via a lubrication port to provide pressurized barrier lubricant within a corresponding inter-packing volume. In other cases, one or more bonnet ports can be drilled into an existing bonnet of a valve assembly and one or more pressure reservoirs (or other reservoirs) can be placed in fluid communication with one or more inter-packing volumes of the valve assembly. In some other cases, one or more process passageways can be drilled into an existing bonnet of a valve assembly to place one or more pressure reservoirs in fluid communication with a process pressure of the valve assembly (e.g., to ensure that inter-packing pressure exceeds process pressure).

The principles of the present disclosure are applicable to various types of valve assemblies, such as sliding stem control valves and rotary shaft control valves, as well as, various packing arrangements, such as jam-style or live-loaded, and various packing materials, such as polytetrafluoroethylene (PTFE) and graphite.

Figure 2:
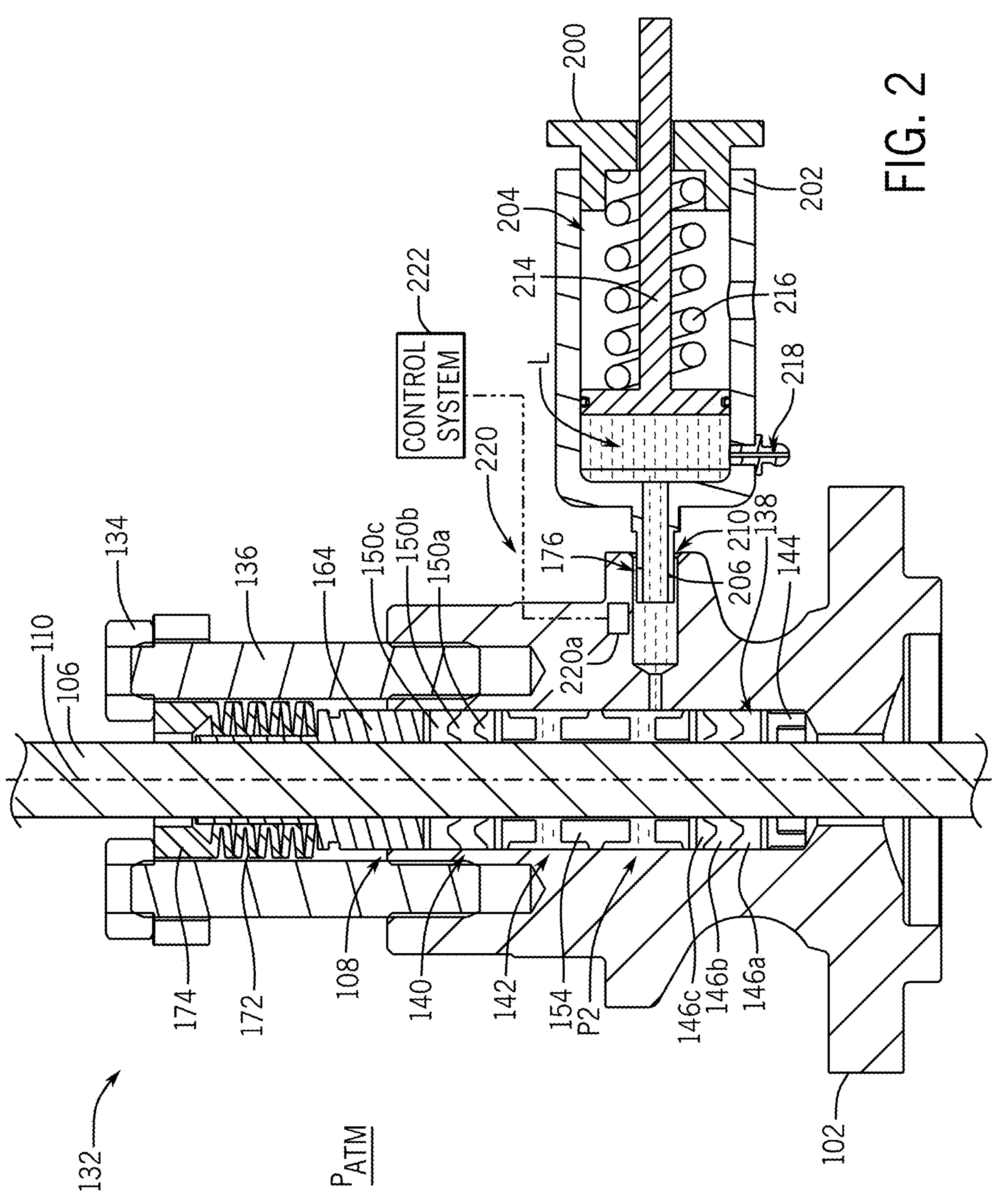
FIG. 2 is a partly schematic enlarged view of the packing system of the valve assembly of FIG. 1 with the valve body not shown.

Referring now to FIGS. 1 and 2, an example of a valve assembly 100 is illustrated. Referring specifically to FIG. 1, the valve assembly 100 is a control valve of the sliding stem type, having a packing system in accordance with the principles of the present disclosure. The illustrated portion of the valve assembly 100 in FIG. 1 includes a bonnet 102 mounted on a valve body 104 and an operating member, shown as sliding stem 106, that extends through a stem bore 108 formed in the bonnet 102 along a central axis 110. Fasteners 112 may be used to removably secure the bonnet 102 to the valve body 104. A valve flow passage 114 extends through the valve body 104 between an inlet 116 and an outlet 118 and provides a path for a process fluid to flow through the valve assembly 100. The process fluid may be any liquid or gas, including steam, water, natural gas, oil or other chemical compounds. The valve flow passage 114 is opened and closed by a control member 120 which is movable by the sliding stem 106 between a closed position and an open position within a cage 122 that is arranged within the valve flow passage 114. One end of the cage 122 contacts a valve seat 124 and the other end of the cage 122 engages a guide 126 (see FIG. 2) disposed on a bottom side of the bonnet 102 concentric with the central axis 110, such that the cage 122 is arranged partially within the guide 126 of the bonnet and partially within an opening 128 of the valve body 104.

With the valve assembly 100 in the closed position, as shown in FIG. 1 in particular, the control member 120 sealingly engages the valve seat 124 to prevent the process fluid from passing through the valve assembly 100. In the open position (not shown), the control member 120 is raised from the valve seat 124 to allow the process fluid to pass from the inlet 116 through holes 130 (or other windows) of the cage 122 to the outlet 118. Movement of the control member 120 is accomplished by coupling the control member 120 to an actuator (not shown) by way of the sliding stem 106. The actuator controllably moves the sliding stem 106 linearly along the central axis 110 of the stem bore 108 in the upward and downward directions, thereby causing the control member 120 to move between the open and closed positions, as well as other intermediate positions.

Still referring to FIGS. 1 and 2, an example packing system 132 of the valve assembly 100 includes the bonnet 102, a first, lower (upstream) packing set 138 arranged in a first, lower part of the stem bore 108 about a first, lower portion of the sliding stem 106, and a second, upper (downstream) packing set 140 arranged in a second, upper part of the stem bore 108 about a second, upper portion of the sliding stem 106. Generally, mechanical force can be used to collectively compress the packing sets 138, 140 to ensure appropriate sealing performance. For example, in the example shown, a series of packing nuts 134 are threadably mounted on respective packing studs 136 so as to adjust the loading on the packing sets 138, 140 within the stem bore 108 and around the sliding stem 106.

In the illustrated example, the first and second packing sets 138, 140 define an inter-packing volume 142 within the stem bore 108, relative to flow along a leakage flow path from inside the valve body 104 through the bonnet 102 to atmosphere (e.g., as shown, axially between the first packing set 138 and the second packing set 140 along the axial direction of the stem 106). Referring specifically to FIG. 2, the first packing set 138 includes a first, lower ring 146*a*, a second, middle ring 146*b*, and a third, upper ring 146*c*. The rings 146*a*, 146*b*, 146*c* may be formed of a PTFE material, or any other suitable synthetic resin polymer. In the illustrated example, the middle ring 146*b* is a V-ring (i.e., having a "V"-shaped cross-sectional profile) arranged in an upward orientation (i.e., with an annular indentation thereof facing upwards toward the inter-packing volume 142), the upper ring 146*c* is a male adapter that is received within the annular indentation of the middle ring 146*b*, and the lower ring 146*a* is a female adapter that receives an annular protrusion of the middle ring 146*b*. In some examples, two or more of the rings 146*a*, 146*b*, 146*c* of the first packing set 138 can have a similar cross-sectional profile. In some examples, a carbon bushing may be provided at each end of the first packing set 138 (i.e., adjacent to the lower and upper rings 146*a*, 146*c*). In some examples, the first packing set 138 can include a single ring, two rings, or four or more rings. In some examples, a packing base insert 144 can be arranged within the stem bore 108 between the first packing set 138 and the valve body 104 to provide an optimized sealing surface or material for the lower ring 146*a* of the first packing set 138.

Similarly, with continued reference to FIG. 2, the second packing set 140 includes a first, lower ring 150*a*, a second, upper ring 150*b*, and a third, upper ring 150*c*. The rings 150*a*, 150*b*, 150*c* of the second packing set 140 may be formed of a PTFE material, or any other suitable synthetic resin polymer. In the illustrated example, the middle ring 150*b* is a V-ring arranged in a downward orientation (i.e., with an annular indentation thereof facing downwards toward the inter-packing volume 142), the lower ring 150*a* is a male adapter that is received within the annular indentation of the middle ring 150*b*, and the upper ring 150*c* is a female adapter that receives an annular protrusion of the middle ring 150*b*. In some examples, two or more of the rings 150*a*, 150*b*, 150*c* of the second packing set 140 can have a similar cross-sectional profile. In some examples, a carbon bushing may be provided at each end of the second packing set 140 (i.e., adjacent to the lower and upper rings 150*a*, 150*c*). In some examples, the second packing set 140 can include a single ring, two rings, or four or more rings.

As discussed in more detail below, the first packing set 138 being inverted relative to the second packing set 140 can provide particular functional benefits to the packing system 132 compared to conventional packing systems in which upper and lower packing sets are commonly arranged both in a downward orientation (i.e., with V-rings thereof arranged to oppose the leakage flow path). In some examples, one or both of the packing sets 138, 140 can include one or more mechanical seals that are pressure energized.

The packing sets 138, 140 and other packing sets discussed below are illustrated with particular configurations in the various FIGS. Other configurations for particular packing sets are possible in other examples, including with a variety of known configurations for stacked packing rings or other packing material/arrangements used to reduce leakage past sliding or rotating valve members. Thus, the examples presented in the figures should be understood to be applicable with other types of packing arranged for similar effects on fluid pressure drop.

To provide for improved overall performance, as also generally discussed above, the first and second packing sets 138, 140 collectively define the inter-packing volume 142 within the stem bore 108. For example, as shown in FIG. 2 in particular, the packing sets 138, 140 are spaced apart from each other by a spacer, which thus also partly defines the inter-packing volume 142. In the illustrated example, in particular, the spacer is a support ring 154 (i.e., a "lantern ring" as known in the art) that is disposed around the sliding stem 106 and within the inter-packing volume 142. In other cases, other flow volumes for an inter-packing volume can be otherwise defined, including by features of upstream or downstream packing sets or by otherwise configured mechanical spacers.

Still referring to FIG. 2, a packing follower 164 is disposed partially within the stem bore 108 above the second packing set 140. A series of disk springs 172 (e.g., Belleville springs) are slidably mounted about the sliding stem 106 with one end of the disk springs 172 in contact with the packing follower 164 and the other end of the disk springs 172 in contact with a packing flange 174. The packing studs 136 and sliding stem 106 pass through respective apertures in the packing flange 174. After assembling the first and second packing sets 138, 140 within the stem bore 108 and around the sliding stem 106, the packing nuts 134 on the packing studs 136 are tightened so that the packing flange 174 transmits the nut load to the disk springs 172. The disk springs 172 compress with continued tightening of the packing nuts 134 so as to maintain a spring load on the first and second packing sets 138, 140 by way of the packing follower 164. The compression of the rings **146*a*, 146*b*, 146*c*, 150*a*, 150*b*, 150*c* of the first and second packing sets 138, 140 causes them to sealingly engage the sliding stem 106 and the inner wall of the stem bore 108. In some examples, other generally known components or arrangements of components can be included in the valve assembly 100, in addition to or instead of the packing follower 164 and disk springs 172, to compress the rings 146*a*, 146*b*, 146*c*, 150*a*, 150*b*, 150*c* of the first and second packing sets 138, 140** as described above.

With continued reference to FIGS. 1 and 2, the bonnet 102 of the valve assembly 100 of the present disclosure includes a first port configured as a bonnet port 176 extending through an upper portion of the bonnet 102 and into the inter-packing volume 142, such that the bonnet port 176 is in fluid communication with the inter-packing volume 142 within the stem bore 108. The bonnet port 176 may, for example, be a cylindrical passageway of varied diameter that extends between the stem bore 108 and the exterior of the bonnet 102 such that one end of the bonnet port 176 opens into the inter-packing volume 142 within the stem bore 108 and the other end of the bonnet port 176 opens to the exterior of the valve assembly 100. In particular, the bonnet port 176 can open into the inter-packing volume 142 between the first packing set 138 and the second packing set 140, relative to a leakage flow path 180 (see FIG. 1) that extends generally in a direction along central axis 110 from the valve flow passage 114 and through the second packing set 140. In some cases, the bonnet port 176 may be aligned with a middle portion of the support ring 154 such that the bonnet port 176 communicates directly with the inter-packing 142 at least partly defined by the support ring 154.

In some examples, it may be possible to utilize a pre-existing lubrication port of the valve assembly as the bonnet port 176. Lubrication ports are included on many valve assemblies, including conventional control valves, for the purpose of introducing lubricant into the bore to reduce the sliding friction between the sliding stem and the packing system. Accordingly, some valve assemblies may be outfitted (or retrofitted) with the packing system in accordance with principles of the present disclosure without substantially altering the design or configuration of the valve assembly at large, including by configuring a retrofit packing system to define an inter-packing volume, between upstream and downstream packing sets, that is appropriately in fluid communication with the pre-existing lubrication port.

In the illustrated example of FIG. 1, and as described above, the valve assembly 100 is a stem-guided control valve having a "flow up" configuration. In the "flow up" configuration, the valve assembly 100 is capable of throttling flow of process fluid through the valve flow passage 114 between open and closed positions having a relatively high pressure drop, such as, for example, a pressure drop exceeding 1,000 pounds per square inch differential ("psid") applied in the "flow up" direction. In this configuration, when the sliding stem 106 is in the closed position (as shown in FIG. 1), an upstream pressure (P1) (i.e., a process pressure when the sliding stem in in the open position) at an inlet volume 194 near the inlet 116 of the valve body 104 passes through a plurality of balance holes 198 of the control member 120 to act on the first packing set 138 of the packing system 132. The first packing set 138 provides a seal or other substantial pressure drop between the inter-packing volume 142 of the stem bore 108, so as to substantially prevent leakage, as generally discussed above.

As discussed above, in order to counteract leakage across the packing system 132 from the upstream pressure P1, the packing follower 164 is configured to apply a force in an axial direction along central axis 110 of the stem bore 108 onto the packing system 132. However, also as noted above, with increasing packing pressure can result in increased friction with the sliding stem 106, decreased efficiency, and decreased component lifespan. For reasons discussed above, as well as others that will be apparent to those of skill in the art, the packing system 132 provided by the example valve assembly 100 can help to counteract these negative effects while also reducing overall leakage as compared to conventional systems.

Generally, according to aspects of the present disclosure, a packing system can include a packing-based sealing system that utilizes a barrier lubricant disposed in an inter-packing volume to provide a fluid barrier between a valve flow passage and an ambient environment that can provide increased sealing performance compared to conventional packing system. Various types of barrier lubricants can be utilized to provide the aforementioned benefits. In particular, any type of fluid having a larger molecular size than that of a given process fluid can be utilized as a barrier lubricant. In addition to providing a fluid barrier, the barrier lubricant can also be configured to provide lubrication between a stem of a valve assembly and one or more packing sets of a packing system (such as, e.g., between the sliding stem 106 and the packing sets 138, 140 of the packing system 132 of the valve assembly 100). For example, in some implementations, the barrier lubricant can be a liquid, such as grease or oil (such as, e.g., a synthetic grease or oil comprising perfluoropolyether (PFPE) and polytetrafluoroethylene (PTFE)). In other implementations, the barrier lubricant can be a gas. In some implementations, a packing system can utilize two or more barrier lubricants having one or more properties that differ.

Referring again to FIGS. 1 and 2, in the illustrated example, a barrier lubricant (L) (e.g., grease) is injected under pressure into the inter-packing volume 142 via the bonnet port 176 to be contained within the inter-packing volume 142 by the first and second packing sets 138, 140. The barrier lubricant L can be replenished and pressurized within the inter-packing volume 142 by a canister 200 (e.g., a pressurized barrier lubricant reservoir) or other pressurized fluid source (e.g., other reservoir) that is external to the bonnet 102 and in fluid communication with the bonnet port 176. In particular, the canister 200 has a canister body 202 that defines a canister chamber 204 and a canister port 206 extending from the canister body 202. The canister port 206 defines a canister passageway 210 that is in fluid communication with the canister chamber 204. In the illustrated example, the canister port 206 is attached (e.g., threadably) to the bonnet port 176 such that the canister chamber 204 is in fluid communication with the inter-packing volume 142 via the canister passageway 210 and the bonnet port 176. In various other examples, including variations on the systems discussed with respects to other FIGS., various other sources of pressurized barrier lubricant L (i.e., other than the illustrated canisters) can be used as appropriate.

The canister 200 or other reservoir can be variously configured to pressurize and maintain pressure P2 of the barrier lubricant L within the inter-packing volume 142 to be at or above a first pressure. For example, referring specifically to FIG. 2, the canister 200 includes a canister piston 214 arranged within the canister chamber 204 that is linearly displaceable within the canister chamber 204 between one end of the canister chamber 204 that is adjacent to the canister passageway 210 and another end that is opposite the canister passageway 210, and is biased towards the canister passageway 210 by a piston spring 216. Thus, in the illustrated example, the canister piston 214 is spring-biased but could be otherwise configured to pressurize and maintain pressure of barrier lubricant L within the canister chamber 204. In some examples, the canister port 206 can be in fluid communication with the bonnet port 176 via external tubing (not shown) connected to the bonnet port 176 and the canister port 206. In some examples, the canister body 202 can further include a canister inlet 218 that can be configured to add or replenish barrier lubricant L to the canister chamber 204 while not permitting barrier lubricant L out of the canister chamber 204 (e.g., to replenish barrier lubricant L that leaks from the inter-packing volume 142 during continued operation of the valve assembly 100).

Referring specifically to FIG. 2, during operation of the valve assembly 100, a volume of the barrier lubricant L can be disposed within each of the inter-packing volume 142 of the stem bore 108, the bonnet port 176, the canister passageway 210, and the canister chamber 204. The canister 200 can be configured (e.g., via selection of the piston spring 216 or a surface area of a piston head of the canister piston 214) to maintain a fluid barrier pressure P2 of barrier lubricant L within the inter-packing volume 142 of the stem bore 108.

In some examples, to reduce fugitive emissions from the packing system 132, the fluid barrier pressure P2 can be maintained (e.g., via the canister 200) at a pressure that is higher than pressure of process fluid within the valve flow passage 114 of the valve body 104 (e.g., the upstream pressure P1 (see FIG. 1)). This can help to ensure that barrier lubricant L within the inter-packing volume 142 leaks upstream along the leakage flow path 180 into the valve flow passage 114, instead of process fluid leaking downstream along the leakage flow path 180 through the first packing set 138 (and then to atmosphere, via the second packing set 140). More specifically, relative to flow along the leakage flow path 180 out of the valve body 104, a negative differential pressure across the first packing set 138 is provided to drive leakage of barrier lubricant L from the inter-packing volume 142 into the process fluid, and a positive differential pressure across the second packing set 140 is provided to drive leakage of barrier lubricant L—but not process fluid—from the inter-packing volume 142 to atmosphere. In this regard, as briefly discussed above, the first packing set 138 in the upward orientation being inverted relative to the second packing set 140 in the downward orientation can help minimize leakage of barrier lubricant L both through the first packing set 138 to the valve flow passage 114 and through the second packing set 138 to atmosphere.

Figure 3:
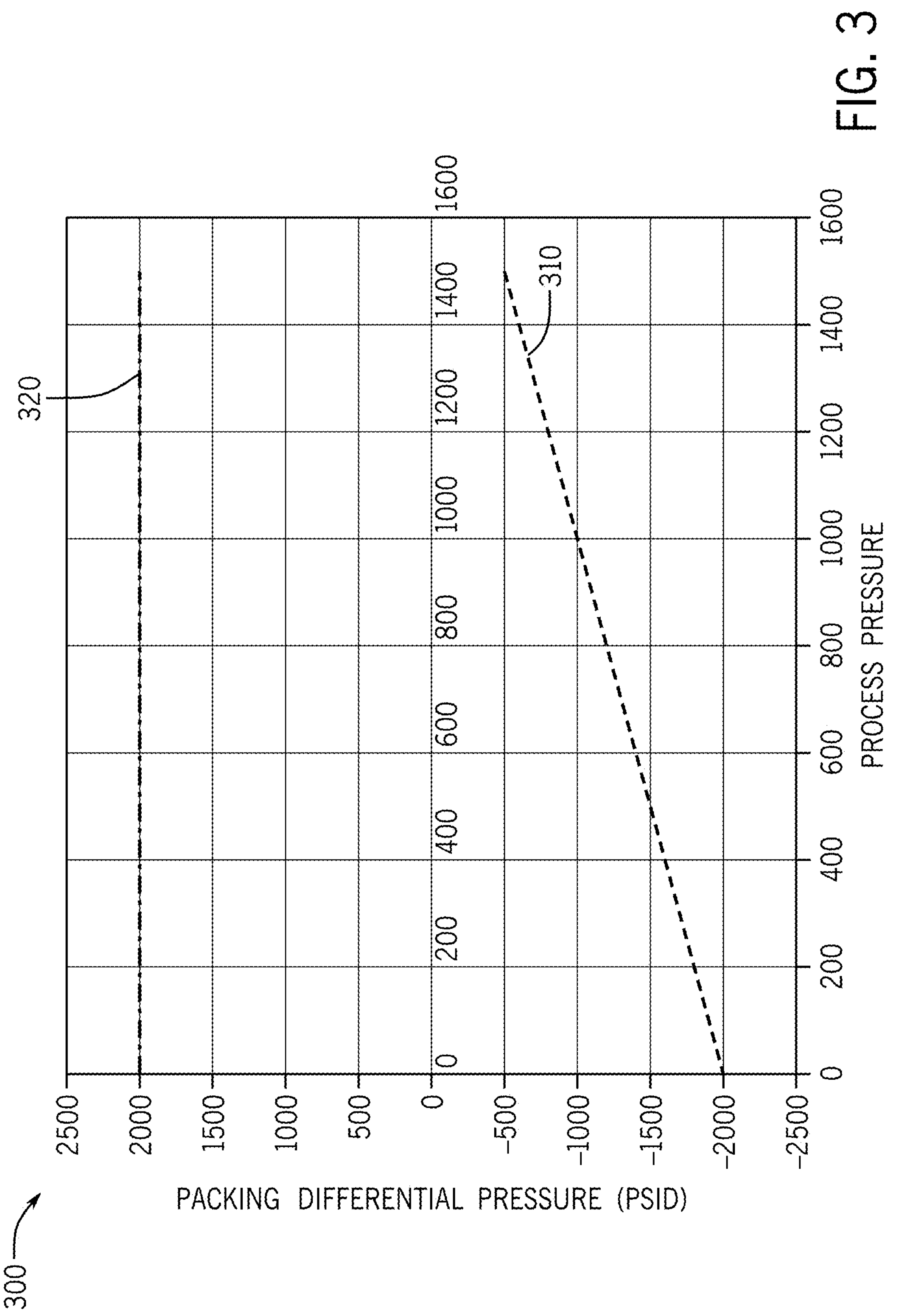
FIG. 3 is a graph showing a relationship between a process pressure and first and second packing differential pressures of the packing system of the valve assembly of FIG. 1.

In this regard, FIG. 3 is a graph 300 that shows a packing differential pressure as a function of a process pressure of process fluid within the valve flow passage 114. In particular, the graph 300 includes a first line 310 corresponding to a first packing differential pressure ($\Delta P_1$) across the first packing set 138 (i.e., the process pressure P1 minus the fluid barrier pressure P2) and a second line 320 corresponding to a second packing differential pressure ($\Delta P_2$) through the second packing set 140 (i.e., the fluid barrier pressure P2 minus atmospheric pressure $P_{atm}$). In this particular example, the valve assembly 100 has a maximum process pressure P1 of 1,500 pounds per square inch ("psi") and the canister 200 of the packing system 132 is configured to maintain a fluid barrier pressure P2 of 2,000 psi within the inter-packing volume 142 (e.g., via the piston spring 216).

As shown in FIG. 3, when the process pressure P1 is 0 psi and the fluid barrier pressure P2 is 2,000 psi, the first packing differential pressure $\Delta P_1$ through the first packing set 138 is −2,000 psi. The first packing differential pressure $\Delta P_1$ has a positive correlation with the process pressure P1 in that the first packing differential pressure $\Delta P_1$ increases as the process pressure P1 increases. On the other hand, as the process pressure P1 increases toward 1,500 psi, the second packing differential pressure $\Delta P_2$ is maintained at 2,000 psi. Because the fluid barrier pressure P2 is maintained at a pressure (e.g., 2,000 psi) that is always higher than the process pressure P1 (e.g., a maximum of 1,500 psi), barrier lubricant L may leak past the first packing set 138 into valve flow passage 114 of the valve body 104 (see FIG. 1) but the arrangement almost entirely prevents process fluid from leaking past the first packing set 138 into the inter-packing volume 142 (or past the second packing set 140 to atmosphere).

In some examples, the packing system 132 of the valve assembly 100 can include a sensor arrangement 220 with one or more sensors 220*a* configured to sense a flow of barrier lubricant L to the bonnet port 176 and a control system 222 configured to receive signals from the sensor arrangement to determine a leakage of barrier lubricant L out of the inter-packing volume 142 of the bonnet 102. In some examples, a sensor of the sensor arrangement 220 can be included on the canister 200 and can be configured to sense the fluid barrier pressure P2 or other pressures (such as, e.g., a pressure gauge or transmitter). Generally, a leakage rate of one or more packing sets of a packing system (or other factors) can provide an indication of the variable leakage rate of the packing system. In some cases, such a leakage rate can indicate degradation of sealing performance during the lifecycle of the packing system. Accordingly, it may be useful to determine leakage rates for various packing sets (e.g., as discussed above or in other examples below) to support various diagnostic and maintenance operations.

In some examples, a pressurized reservoir of barrier lubricant L (e.g., the canister 200) can supplement or even render obsolete one or more components of a conventional spring-loaded packing system. For example, with reference again to the packing system 132 of the valve assembly 100 of FIG. 1, the canister 200 providing the fluid barrier pressure P2 within the inter-packing volume 142 may not require use of the disk springs 172, which are compressed by way of the packing nuts 134 on the packing flange 174, to maintain a spring load on the first and second packing sets 138, 140 by way of the packing follower 164 to cause the rings 146*a*, 146*b*, 146*c*, 150*a*, 150*b*, 150*c* to sealingly engage the stem 106 and the inner wall of the stem bore 108. More specifically, the canister 200 can provide an alternative form of live loading for both of the packing sets 138, 140, as opposed to the spring-assisted loading provided by the disk springs 172. Thus, some examples can provide improved sealing performance of packing system 132 in response to temperature fluctuations, with overall reduction of cost of the valve assembly 100 due to the reduction or elimination of the springs 172. Accordingly, in some examples, the packing system 132 of the valve assembly 100 may include only the canister 200 (or other source of pressurized barrier lubricant L) and not the disk springs 172.

In some examples, devices or systems (e.g., a valve assembly or a packing system thereof) disclosed herein can be utilized, manufactured, or installed using methods embodying aspects of the disclosed technology. Correspondingly, description herein of particular features, capabilities, or intended purposes of a device or system is generally intended to inherently include disclosure of a method of using such features for the intended purposes, a method of implementing such capabilities, a method of manufacturing relevant components of such a device or system (or the device or system as a whole), and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as examples of the disclosed technology, of the utilized features and implemented capabilities of such device or system.

In this regard, for example, aspects of the present disclosure can include methods for retrofitting an existing valve assembly to include a packing system that is configured to maintain a fluid barrier pressure within an inter-packing volume of the packing system. For example, referring specifically to the packing systems 132, 432 of FIGS. 2 and 4, respectively, in some cases an existing lubrication port of a bonnet of an existing valve assembly can be utilized as a bonnet port (e.g., bonnet ports 176, 476) to provide pressurized barrier lubricant L to an inter-packing volume. Thus, in such examples, a valve assembly can be retrofitted to have a pressurized barrier lubricant L within an inter-packing volume by placing a canister (e.g., canisters 200, 500) in fluid communication with the lubrication port. In other examples, a bonnet port can be drilled into an existing bonnet of the valve assembly. Further, referring specifically to FIG. 3, in some examples, a process passageway (e.g., process passageway 478) can be drilled into an existing bonnet of the valve assembly.

It is contemplated that a packing system of a valve assembly can be configured differently than the example packing system 132 of the valve assembly 100 as discussed with reference to FIGS. 1-3. For example, in some applications, it may be beneficial to minimize differential pressure across two or more packings sets of a packing system utilizing a pressurized barrier lubricant in one or more inter-packing volumes. In other applications, it may be beneficial to reduce process contamination resulting from barrier lubricant leakage of a packing system into a valve flow passage of a valve assembly. In this regard, additional example configurations of a packing system of a valve assembly will be described in greater detail below with reference to FIGS. 4-9.

Figure 4:
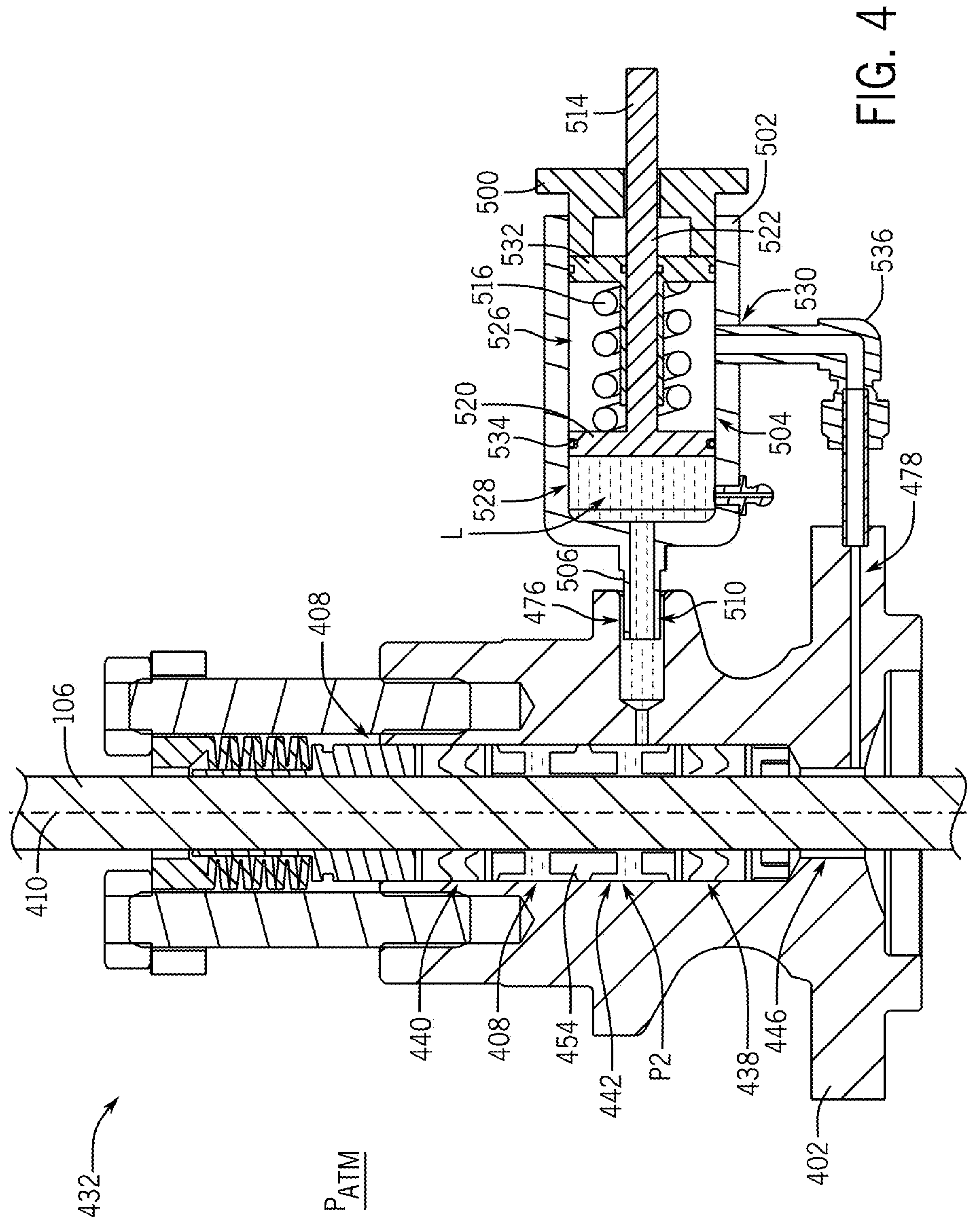
FIG. 4 is a cross-sectional view of another example configuration of the packing system of the valve assembly of FIG. 1, in accordance with principles of the present disclosure.

In particular, FIG. 4 depicts an example packing system 432 of the valve assembly 100 (see FIG. 1). The packing system 432 is similar to the previously discussed example packing system 132, with like elements being indicated by similar reference numerals under the "400 and 500 series" of reference numerals. For example, the packing system 432 includes a bonnet 402 that is mounted to the valve body 104 (see FIG. 1) just as the packing system 132 includes the bonnet 102.

While the packing system 432 is similar to the packing system 132 in many aspects, there are some aspects that differ. For example, similarly to the packing system 132, the packing system 432 includes a first packing set 438, a second packing set 440, and a canister 500 configured to maintain a fluid barrier pressure P2 within an inter-packing volume 442 defined by the first and second packing sets 438, 440 and a support ring 454 arranged within a stem bore 408 of the bonnet 402. Further, the first and second packing sets 438, 440 of the packing system 432 are arranged similar to the first and second packing sets 138, 140 of the packing system 132 and a canister port 506 of the canister 500 is in fluid communication with the inter-packing volume 442 via a bonnet port 476. In contrast to the packing system 132, however, the canister 500 of the packing system 432 includes a process port 530 that is in communication with a process passageway 478 in the bonnet 402 to sense a process pressure P1 at a location upstream of the first packing set 438, relative to the leakage flow path 180 (see FIG. 1). Accordingly, the canister 500 can pressurize the barrier lubricant L within the inter-packing volume 442 (i.e., the fluid barrier pressure P2) to be above the process pressure P1 (see FIG. 1). In other words, the canister 500 of the packing system 432 is configured to ensure that that the fluid barrier pressure P2 remains above process pressure (e.g., at a predetermined margin or offset) for a range of process pressures P1 during operation of the valve assembly 100, with similar benefits to those discussed for the example packing system 132 of FIGS. 1 and 2.

Referring specifically to FIG. 4, the process port 530 of the canister 500 of the packing system 432 is in fluid communication with a canister chamber 504 defined by a canister body 502 of the canister 500. More specifically, the process port 530 is in fluid communication with a variable volume tailspace 526 of the canister chamber 504 that is rearward of a variable volume headspace 528 defined by a piston head 520 of a canister piston 514 of the canister 500. In some examples, the variable volume tailspace 526 can be fluidically isolated from the variable volume headspace 526 and thus also from the inter-packing volume 442 (such as, e.g., via one or more sealing members 534 within the canister chamber 504). The canister 500 further includes a piston sleeve 532 arranged within the canister chamber 504 that is configured to slidably receive a piston shaft 522 of the canister piston 514. In the illustrated example, the piston sleeve 532 slidably receives both a piston spring 516 and the piston shaft 522 of the canister piston 514 such that the piston shaft 522 is slidably displaceable within the piston sleeve 532. In some examples, the piston sleeve 532 can be configured to limit displacement of the piston head 520 away from the canister port 506 and thus can correspondingly limit compression of the piston spring 516 and define a maximum volume of the variable volume headspace 528 of the canister 500 (i.e., a minimum volume of the variable volume tailspace 526). In some examples, the piston sleeve 532 can be configured to be slidably moveable within the canister chamber 504 toward a canister passageway 510 defined by the canister port 506 to vary maximum or minimum volumes of the variable volume tailspace and headspace 526, 528.

Referring still to FIG. 4, the variable volume tailspace 526 of the canister chamber 504 is in fluid communication with the process passageway 478 of the bonnet 402 via the process port 530. The process passageway 478 of the bonnet 402 extends through an exterior surface of the bonnet 402 and toward a central axis 410 of the bonnet 402 and opens into a bore stem inlet 446 of the bore stem 408 that is disposed between the first packing set 438 and the valve flow passage 114 of the valve body 104 (see FIG. 1). In other words, the bore stem inlet 446 is upstream of the first packing set 438 relative to the leakage flow path 180 (see FIG. 1) and is fluid communication with the valve flow passage 114 of the valve body 104. In the illustrated example, the process port 530 is in fluid communication with the process passageway 478 of the bonnet 402 via external tubing 536. In some examples, the process port 530 of the canister 500 can be secured directly to the bonnet 402 at the process passageway 478 of the bonnet 402.

Figure 5:
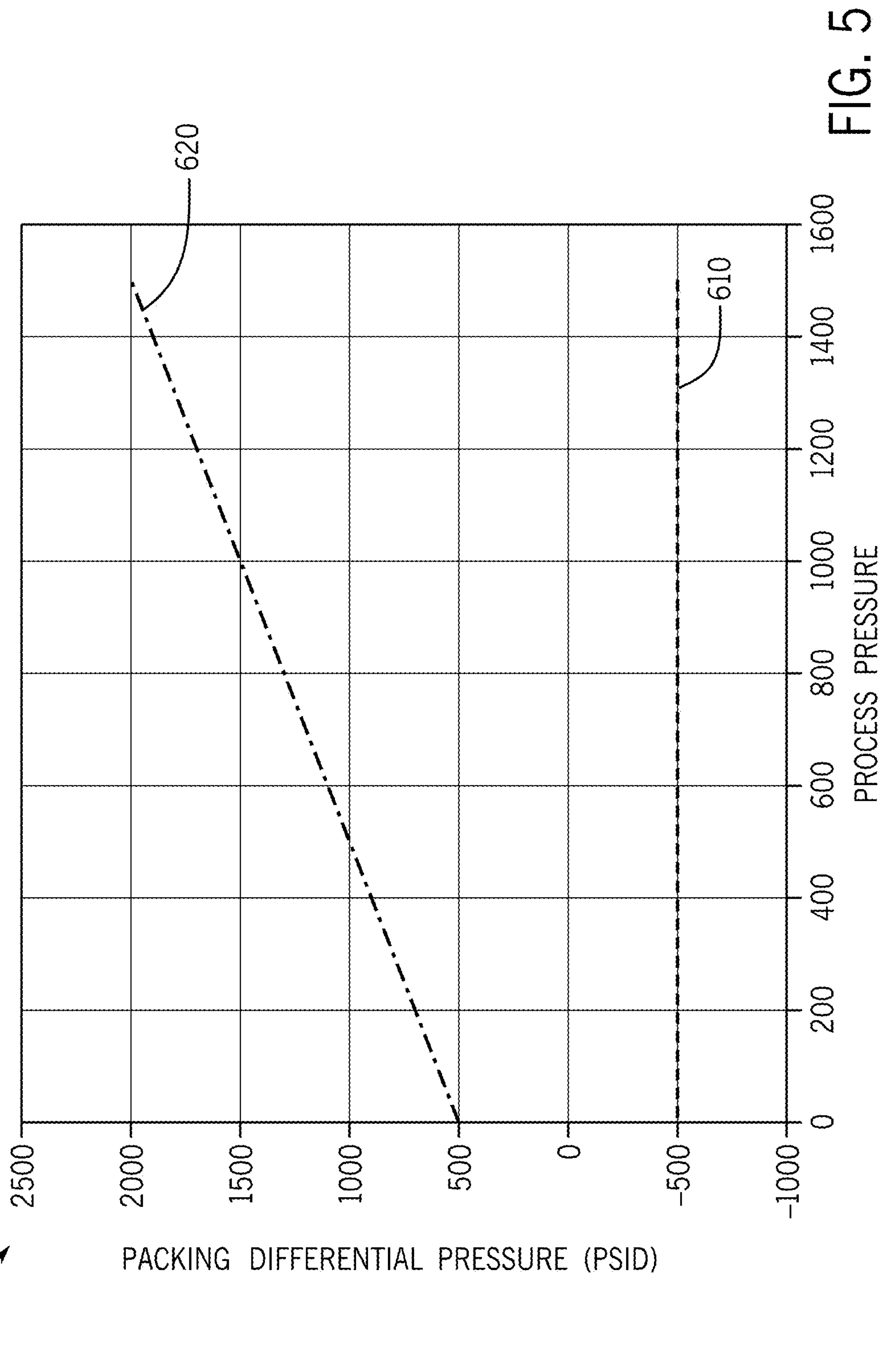
FIG. 5 is a graph showing a relationship between a process pressure and first and second packing differential pressures of the valve assembly configuration of FIG. 4.

As briefly described above, the packing system 432 can assist the piston spring 516 in maintaining the fluid barrier pressure P2 to be above varying process pressure P1 by exposing the variable volume tailspace 526 of the canister 500 to the process pressure P1. With P2 thus tracking P1, the system 432 can provide reduced pressure differentials across the first and second packing sets 438, 440, with correspondingly reduced wear on the first and second packing sets 438, 440 during continued operation of the valve assembly 100. In this regard, FIG. 5 is a graph 600 that shows packing differential pressures as a function of a process pressure P1 within the valve flow passage 114 of the valve body 104 (see FIG. 1) of the valve assembly 100 having the bonnet 402 with the packing system 432. Like the graph 300, the graph 600 includes a first line 610 corresponding to the first packing differential pressure $\Delta P_1$ through the first packing set 438 (i.e., between the process pressure P1 and the fluid barrier pressure P2) and a second line 620 corresponding to the second packing differential pressure ΔP2 through the second packing set 440 (i.e., between the fluid barrier pressure P2 and atmospheric pressure $P_{atm}$). In this particular example, the valve assembly 100 has a maximum process pressure P1 of 1,500 psi and the canister 500 of the packing system 432 is configured to provide a minimum fluid barrier pressure P2 of 500 psi.

As shown in FIG. 5, when the process pressure P1 is 0 psi and the fluid barrier pressure P2 is at the minimum pressure of 500 psi, the first packing differential pressure $\Delta P_1$ through the first packing set 438 is at −500 psi and the second packing differential pressure $\Delta P_2$ through the second packing set 440 is 500 psi. The second packing differential pressure $\Delta P_2$ has a positive correlation with the process pressure P1 in that the second packing differential pressure $\Delta P_2$ increases as the process pressure P1 increases (i.e., because of the corresponding increase in P2). In addition, due to the variable volume tailspace 526 of the canister chamber 504 being exposed to the process pressure P1 via the process port 530, the second packing differential pressure $\Delta P_2$ has a constant offset of 500 psi (i.e., the minimum fluid barrier pressure P2 provided by the piston spring 516) relative to the process pressure P1 at any given time. For example, when the process pressure P1 is at 800 psi the second packing differential is at 1,300, and when the process pressure P1 is at the maximum of 1,500 psi the second packing differential $\Delta P_2$ is at 2,000 psi. Further, because the fluid barrier pressure P2 is maintained at the constant offset of 500 psi relative to the process pressure P1, the first packing differential $\Delta P_1$ is maintained at −500 psi for any given process pressure P1 between 0 psi and 1,500 psi. As also discussed with regard to FIG. 3, this provision of negative first packing differential pressure $\Delta P_1$ may result in some leakage of barrier lubricant L from the inter-packing volume 442 into the valve flow passage 114 (see FIG. 1) through the first packing set 438, but it also prevents process fluid from process fluid from leaking to atmosphere through the first and second packing sets 438, 440.

In addition to helping reduce fugitive emissions along the leakage flow path 180, the arrangement of FIG. 4 reduces differential pressures $\Delta P_1$, $\Delta P_2$ (and total differential pressure $\Delta P_2$-$\Delta P_1$) relative to the arrangement of FIG. 2, over almost the entire illustrated range of P1. This reduction can significantly reduce friction and wear on the first and second packing sets 438, 440 and increase the overall lifespan of the packing system 432, because the packing sets 438, 440 may not need to be compressed to as high of a compression value to provide the required sealing. Further, the packing system 432 can permit a user to customize an offset or margin between the second packing differential pressure $\Delta P_2$ and the process pressure P1 by selecting a particular spring force of the piston spring 516 (which sets the minimum fluid barrier pressure P2) based on the user's preference to prioritize minimized wear on the packing sets 438, 440 or maximized sealing performance of the packing system 432. Thus, in some examples, the packing system 432 can be configured to provide a second packing differential pressure $\Delta P_2$ in a range of about 105% to about 220%, in a range of about 110% to about 190%, in a range of about 115% to about 175%, or in a range of about 120% to about 150% of a maximum process pressure P1 of the valve assembly 100.

Figure 6:
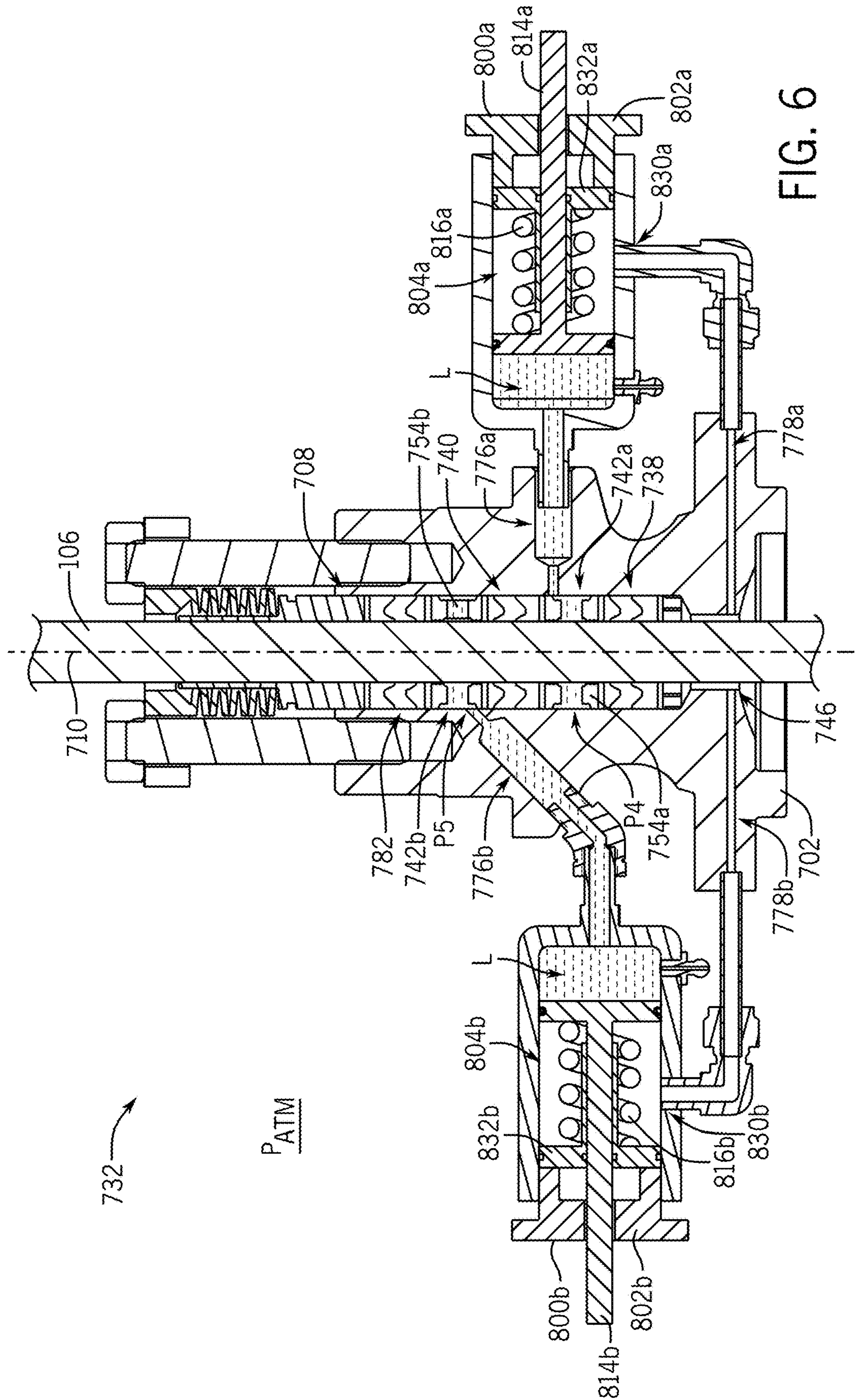
FIG. 6 is a cross-sectional view of yet another example configuration of the packing system of the valve assembly of FIG. 1, in accordance with principles of the present disclosure.

As briefly mentioned above, in some applications, it may be beneficial to provide a packing system of a valve assembly that can further reduce leakage of barrier lubricant into a valve flow passage while still providing reduced wear on the packing system and prevention of fugitive emissions. In this regard, FIG. 6 depicts yet another example of a packing system 732 of the valve assembly 100 (see FIG. 1). The packing system 732 is similar to the previously discussed example packing systems 132, 432, with like elements being indicated by similar reference numerals under the "700 and 800 series" of reference numerals. For example, the packing system 732 includes a bonnet 702 that is mounted to the valve body 104 (see FIG. 1) just as the packing systems 132, 432 include the bonnets 102, 402, respectively.

While the packing system 732 is similar to the previously discussed example packing systems 132, 432 in many aspects, there are some aspects that differ. For example, similarly to the packing systems 132, 432, the packing system 732 includes a first support ring 754*a* arranged between a first, lower packing set 738 and a second, middle packing set 740 within a stem bore 708 of the bonnet 702 that defines a first, lower inter-packing volume 742*a*. A first, lower canister 800*a* is in fluid communication with the first inter-packing volume 742*a* via a first, lower bonnet port 776*a* and with a process pressure P1 via a first process passageway 778*a* in the bonnet 702 in fluid communication with a first process port 830*a* of the first canister 800*a*. In contrast to the packing systems 132, 432, however, the packing system 732 further includes a third, upper packing set 782 arranged in the stem bore 708 about a third portion of the stem 106 and spaced apart from the second packing set 740 by a second support ring 754*b* that defines a second, upper inter-packing volume 742*b* within the stem bore 708. In other words, the first packing set 738 is arranged between the valve body 104 and the second packing set 740 and the second packing set 740 is arranged between the first and third packing sets 738, 782 such that the leakage flow path 180 (see FIG. 1) extends from the valve flow passage 114 (see FIG. 1) through the first packing set 738 into the first inter-packing volume 742*a*, through the second packing set 740 into the second inter-packing volume 742*b*, and then through the third packing set 782 to atmosphere.

In the illustrated example, the first and second packing sets 738, 740 are configured similar to the first packing set 138 the packing system 132 (i.e., with rings disposed in an upward orientation), and the third packing set 782 is configured similar to the second packing set 140 of the packing system 132 (i.e., with rings disposed in a downward orientation). Thus, this particular arrangement of the rings of the packing sets 738, 740, 782 can be particularly beneficial in reducing leakage of barrier lubricant L from the second inter-packing volume 742*b* to the first inter-packing volume 742*a* or to atmosphere. In some examples, the second and third packing sets 740, 782 can configured similar to each other (i.e., with rings disposed in the downward orientation). In some examples, each of the packing sets 738, 740, 782 can be configured similar to each other.

Still referring to FIG. 6, the packing system 732 further includes a second canister 800*b* in fluid communication with the second inter-packing volume 742*b* via a second, upper bonnet port 776*b* that extends through an exterior of the bonnet 702 and opens to the second inter-packing volume 742*b*. A second process port 830*b* of the second canister 800*b* is also in fluid communication with the valve flow passage 114 (see FIG. 1) via a second process passageway 778*b* in the bonnet 702. Similar to the first process passageway 778*a*, the second process passageway 778*b* extends through an exterior surface of the bonnet 702 toward a central axis 710 of the bonnet 702 and opens into a stem bore inlet 746 of the stem bore 708 that is disposed between the first packing set 738 and the valve flow passage 114 of the valve body 104 (see FIG. 1). In the illustrated example, the first and second canisters 800*a*, 800*b* of the packing system 732 are configured similar to each other and also similar to the canister 500 of the packing system 432 of FIG. 4. Therefore, the first and second canisters 800*a*, 800*b* include canister bodies 802*a*, 802*b* that define canister chambers 804*a*, 804*b*, respectively, with canister pistons 814*a*, 814*b*, piston springs 816*a*, 816*b*, and piston sleeves 832*a*, 832*b* arranged within the canister chambers 804*a*, 804*b*, respectively. Thus, the first canister 800*a* is configured to pressurize barrier lubricant L within the first inter-packing volume 742*a* to a minimum first fluid barrier pressure (P4) based on the spring force of the first piston spring 816*a*. Similarly, the second canister 800*b* is configured to pressurize barrier lubricant L within the second inter-packing volume 742*b* to a minimum second fluid barrier pressure (P5) based on the spring force of the second piston spring 816*b*.

In the illustrated example, the first canister 800*a* is configured to provide a first fluid barrier pressure P4 that is less than the second fluid barrier pressure P5 provided by the second canister 800*b* (i.e., the first canister 800*a* is a low-pressure canister, and the second canister 800*b* is a high-pressure canister). For example, the first piston spring 816*a* of the first canister 800*a* can have a spring coefficient that is less than that of the second piston spring 816*b* of the second canister 800*b*. This particular configuration of the first and second fluid barrier pressures P4, P5 of the packing system 732 can reduce or eliminate leakage of barrier lubricant L from the first packing set 738 into the valve flow passage 114 (see FIG. 1) of the valve body 104 of the valve assembly 100. As noted above, such leakage can be undesirable as, in some cases, even a small amount of barrier lubricant L could contaminate process fluid flowing through the valve flow passage 114.

In particular, because the first fluid barrier pressure P4 is relatively low, the pressure differential across the first packing set 738 may also be relatively low. Accordingly, the first packing set 738 may be highly dependable in preventing barrier lubricant L from the first interstitial area 742*a*, even at relatively low compression. Further, the relatively high value of the second fluid barrier pressure P5 can further ensure that the any leakage across the second packing set 740 is in an upstream direction along the leakage flow path 180 (see FIG. 1).

Figure 7:
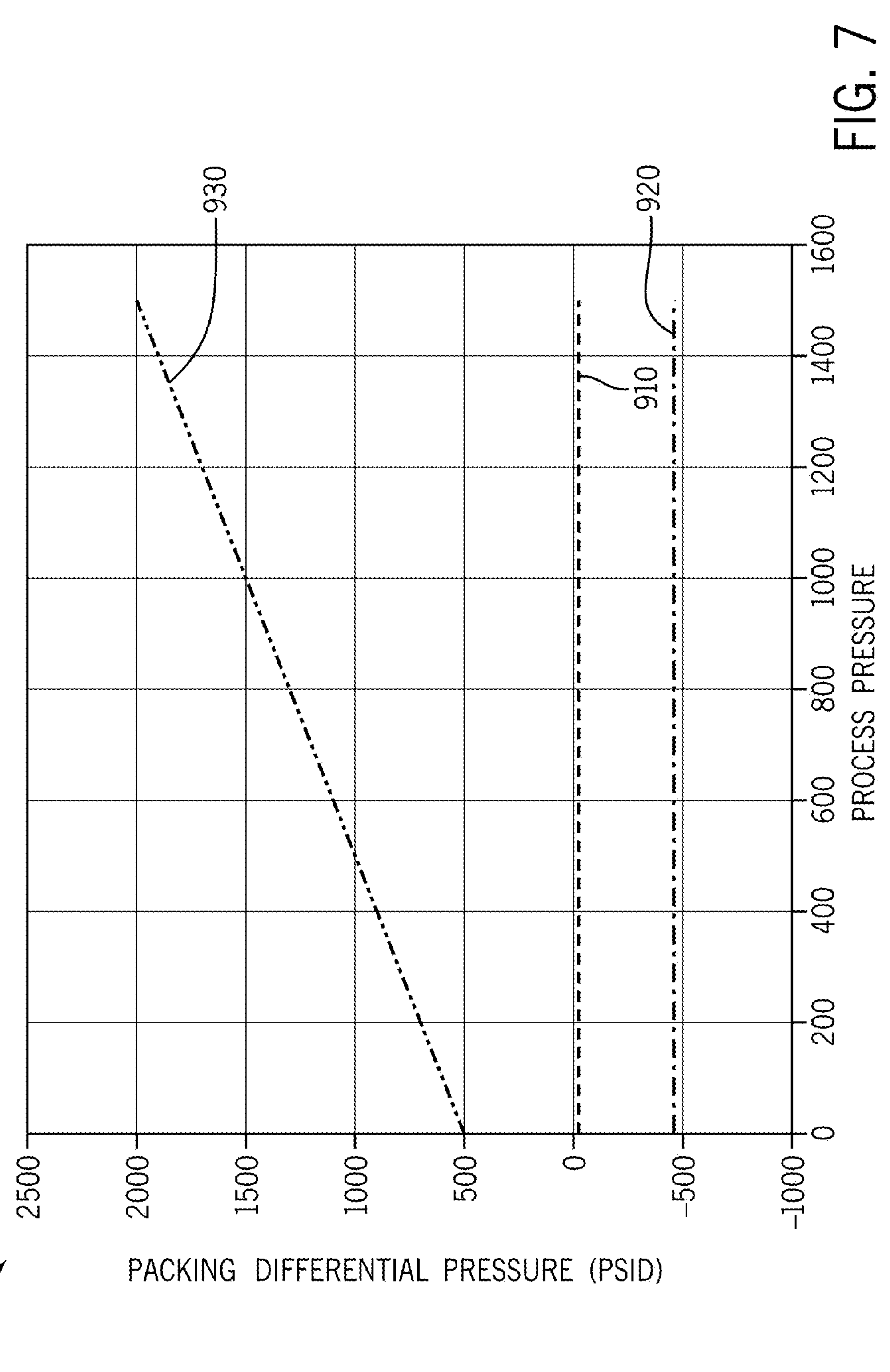
FIG. 7 is a graph showing a relationship between a process pressure and first, second, and third packing differential pressures of the valve assembly configuration of FIG. 6.

In this regard, FIG. 7 is a graph 900 that shows packing differential pressures as a function of a process pressure within the valve flow passage 114 of the valve body 104 (see FIG. 1) of the valve assembly 100 having the packing system 732. The graph 900 of FIG. 7 corresponding to the packing system 732 is similar to the graphs 300, 600 of FIGS. 3 and 5 corresponding to the packing systems 132, 432, respectively. In particular, like the graphs 300, 600, the graph 900 includes a first line 910 corresponding to a first packing differential pressure ($\Delta P_1$) through the first packing set 738 (i.e., between the process pressure P1 and the first inter-packing volume 742*a*), a second line 920 corresponding to a second packing differential pressure ($\Delta P_2$) through the second packing set 740 (i.e., between the first inter-packing volume 742*a* and the second inter-packing volume 742*b*), and a third line 930 corresponding to a third packing differential pressure ($\Delta P_3$) through the third packing set 782 (i.e., between the second inter-packing volume 742*b* and atmosphere) of the packing system 732 of the valve assembly 100.

In this particular example, the valve assembly 100 has a maximum process pressure P1 of 1,500 psi, the first canister 800*a* of the packing system 732 is configured to maintain a minimum first fluid barrier pressure P4 of 25 psi (via the first piston spring 816*a*) within the first inter-packing volume 742*a*, and the second canister 800*b* of the packing system 732 is configured to maintain a minimum second fluid barrier pressure P5 of 500 psi (via the second piston spring 816*b*) within the second inter-packing volume 742*b*. In other words, the first and second canisters 800*a*, 800*b* are configured to provide fluid barrier pressures P4, P5, respectively, that track any changes in the process pressure P1 within a predetermined, relatively small margin during operation of the valve assembly 100 to provide the benefits discussed below.

As shown in FIG. 7, when the process pressure P1 is 0 psi, the first packing differential pressure $\Delta P_1$ through the first packing set 738 is −25 psi, the second packing differential pressure $\Delta P_2$ through the second packing set 740 is −500 psi, and the third packing differential pressure $\Delta P_3$ through the third packing set 782 is 500 psi. The third packing differential pressure $\Delta P_3$ has a positive correlation with the process pressure P1 in that the third packing differential pressure $\Delta P_3$ increases as the process pressure P1 increases. In addition, the third packing differential pressure $\Delta P_3$ has a constant offset of 500 psi (i.e., the minimum second fluid barrier pressure P5 provided by the second piston spring 816*b*) relative to the process pressure P1 at any given time. For example, when the process pressure is at 800 psi the third packing differential is at 1,300, and when the process pressure P1 is at the maximum of 1,500 psi the third packing differential is at 2,000 psi. Further, because the second fluid barrier pressure P5 is maintained at the constant offset of 500 psi relative to the process pressure P1 (e.g., via the second piston spring 816*b*) and the first fluid barrier pressure P4 is maintained at the constant offset of 25 psi relative to the process pressure P1 (e.g., via the first piston spring 816*a*), the second packing differential $\Delta P_2$ is maintained at −500 psi and the first packing differential $\Delta P_1$ is maintained at −25 psi for any given process pressure P1 between 0 psi and 1,500 psi.

Referring again to FIG. 6, the first inter-packing volume 742*a* having the first fluid barrier pressure P4 that is lower than the second fluid barrier pressure P5 of the second inter-packing volume 742*b* permits barrier lubricant L to leak from the second inter-packing volume 742*b* through the second packing set 740 and into the first inter-packing volume 742*a*. Thus, the first inter-packing volume 742*a* can function as a receptacle for leakage of barrier lubricant L from the second inter-packing volume 742*b* and prevents leakage of barrier lubricant L into the valve flow passage 114 of the valve body 104 (see FIG. 1) through the first packing set 738. More specifically, the first packing differential pressure $\Delta P_1$ is minimized to an amount that likely prevents leakage of barrier lubricant L from the first inter-packing volume 742*a* into the valve flow passage 114.

However, leakage from the second inter-packing volume 742*b* into the first inter-packing volume 742*a* may increase as at least the second packing set 740 wears down and the performance of the packing system 732 generally decays. Accordingly, in some examples, the first canister 800*a* can include a visual indicator (not shown) that can indicate that a threshold maximum volume of the first canister 800*a* has been exceeded as a result of accumulation of excess barrier lubricant L within the first inter-packing volume 742*a* (i.e., a threshold maximum barrier lubricant volume within with the first inter-packing volume 742*a*), which can be indicative that maintenance or replacement of the packing system 732 is needed. For example, in some implementations, a visual indicator can be included on a portion of a piston stem of the first canister piston 814*a* that extends outward from the first canister body 802*a*. Similarly, in some such examples, the second canister 802*b* of the packing system 732 can include a visual indicator in addition (or alternative) to a visual indicator of the first canister 800*a*.

In some examples, the packing system 732 can include a sensor arrangement (not shown) configured to sense a flow of barrier lubricant L to the bonnet ports 776*a*, 776*b* and a control system (not shown) configured to receive signals from the sensor arrangement to determine a leakage of barrier lubricant L out of the first or second inter-packing volumes 742*a*, 742*b* of the bonnet 702. For example, in some such implementations, a sensor arrangement of the packing system 732 can include one or more position sensors arranged to sense a position of the canister pistons 814*a*, 814*b* relative to the canister bodies 802*a*, 802*b* of the canisters 800*a*, 800*b*, respectively. In other such implementations, a sensor arrangement of the packing system 732 can include one or more sensors arranged to sense flow of barrier lubricant L directly through one or both of the bonnet ports 776*a*, 776*b*.

Figure 8:
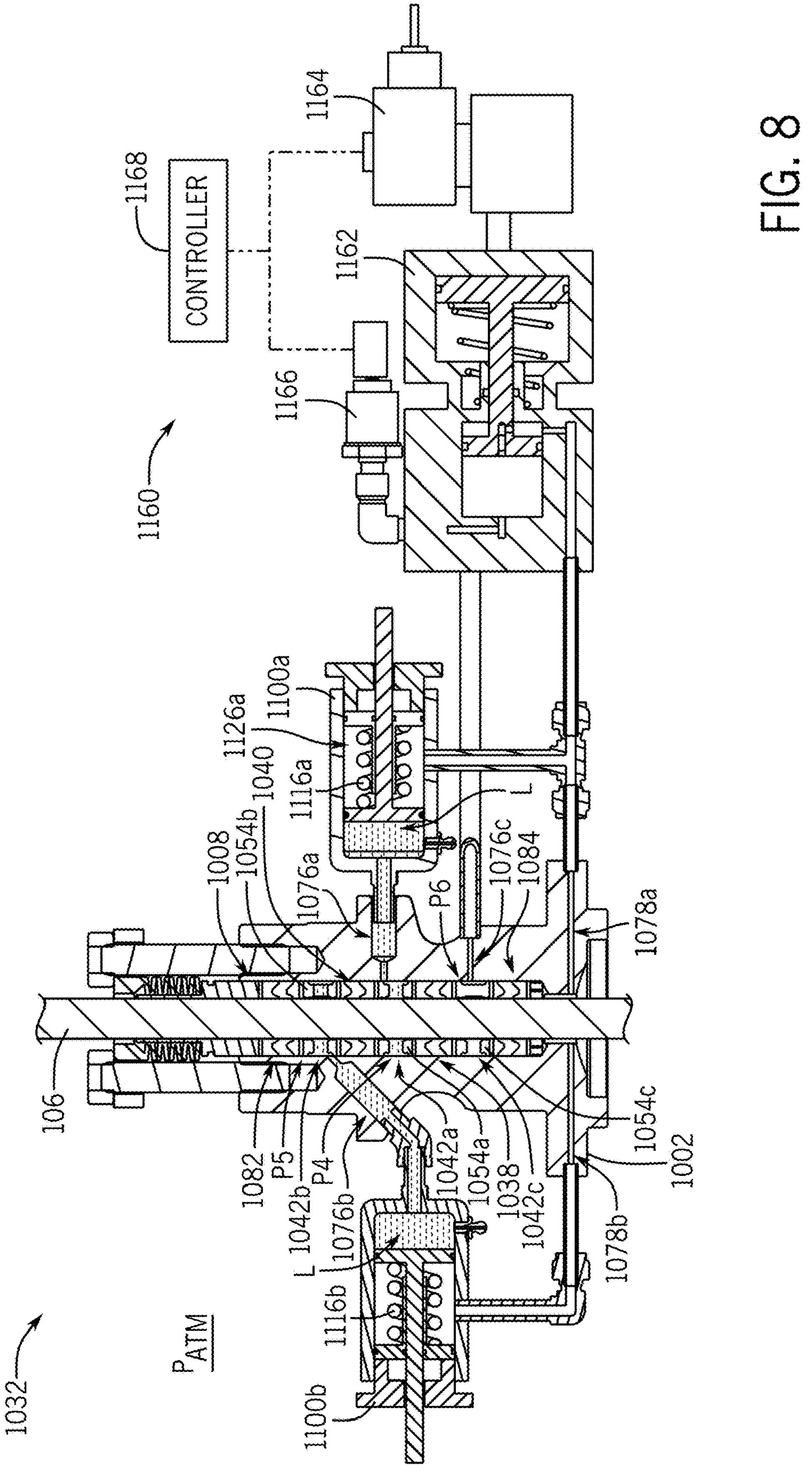
FIG. 8 is a cross-sectional view of still another example configuration of the packing system of the valve assembly of FIG. 1, in accordance with principles of the present disclosure.

In some applications, such as, e.g., those involving particularly sensitive process fluids, it may be beneficial for a packing system of a valve assembly to be configured to nearly entirely prevent leakage of barrier lubricant into a valve flow passage while still providing reduced wear on the packing system and prevention of fugitive emissions. In this regard, FIG. 8 depicts yet another example packing system 1032 of the valve assembly 100 (see FIG. 1). The packing system 1032 is similar to the previously discussed example packing systems 132, 432, 732, with like elements being indicated by similar reference numerals under the "1000 and 1100 series" of reference numerals. For example, the packing system 1032 includes a bonnet 1002 that is mounted to the valve body 104 (see FIG. 1) just as the packing systems 132, 432, 732 include the bonnets 102, 402, 702, respectively.

While the packing system 1032 is similar to the previously discussed example packing systems 132, 432, 732 in many aspects, there are some aspects that differ. For example, similarly to the packing systems 132, 432, 732, the packing system 1032 includes a first, middle support ring 1054*a* arranged between a first, lower-middle packing set 1038 and a second, middle-upper packing set 1040 within a stem bore 1008 of the bonnet 1002 that defines a first, middle inter-packing volume 1042*a*. A first, lower canister 1100*a* is in fluid communication with the first inter-packing volume 1042*a* via a first, middle bonnet port 1076*a* and with a process pressure P1 via a first process passageway 1078*a* in the bonnet 1002. Also similarly, the packing system 1032 further includes a third, upper packing set 1082 arranged in the stem bore 1008 about a third portion of the stem 106 and spaced apart from the second packing set 1040 by a second support ring 1054*b* that defines a second, upper inter-packing volume 1042*b*. A second, upper canister 1100*b* is in fluid communication with the second inter-packing volume 1042*b* via a second, upper bonnet port 1076*b* and also in fluid communication with a process pressure P1 via a second process passageway 1078*b* in the bonnet 1002.

In contrast to the packing systems 132, 432, 732, however, the packing system 1032 further includes a fourth, lower packing set 1084 arranged in the stem bore about a fourth portion of the stem 106 and spaced apart from the first packing set 1038 by a third support ring 1054*c* that defines a third, lower inter-packing volume 1042*c* within the stem bore 1008. In other words, the fourth packing set 1084 is arranged between the valve body 104 and the first packing set 1038 and the second packing set 1040 is arranged between the first and third packing sets 1038, 1082 such that the leakage flow path 180 (see FIG. 1) extends from the valve flow passage 114 (see FIG. 1) through the fourth packing set 1084 into the third inter-packing volume 1042*c*, through the first packing set 1038 into the first inter-packing volume 1042*a*, through the second packing set 1040 into the second inter-packing volume 1042*b*, and then through the third packing set 1082 to atmosphere.

In the illustrated example, the first and third packing sets 1038, 1082 are configured similar to the first packing set 138 of the packing system 132 (i.e., with rings disposed in the upward orientation), and the second and fourth packing sets 1040, 1084 are configured similar to the second packing set 140 of the packing system 132 (i.e., with rings disposed in the downward orientation). This particular arrangement of the rings of the packings sets 1038, 1040, 1082, 1084 can be particularly beneficial to oppose leakage of barrier lubricant L from the second inter-packing volume 1042*b* to the first inter-packing volume 1042*a* or to atmosphere and to oppose leakage from the third inter-packing volume 1042*c* for reasons that will be apparent from the discussion that follows. In some examples, at least the first and second packing sets 1038, 1040 can configured similar to each other. In some examples, three or more of the packing sets 1038, 1040, 1082, 1084 can be configured similar to each other.

Referring still to FIG. 8, the packing system 1032 can further include a booster system 1160 that can be configured to provide process fluid at an elevated pressure to the third inter-packing volume 1042*c*. In the illustrated example of FIG. 8, the booster system 1160 of the packing system 1032 includes a pump 1162 that is configured to increase or boost pressure of process fluid to a pump pressure (P6), a pump actuator 1164 (e.g., a solenoid actuated valve) configured to permit or block flow from an air supply (not shown) to the pump 1162, a pressure transmitter 1166 configured to sense the pump pressure P6 at the pump 1162 (i.e., an output pressure of the pump 1162), and a controller 1168 in electrical communication with the pump actuator 1164 and the pressure transmitter 1166. The controller 1168 can be configured to receive signals from the pressure transmitter 1166 corresponding to the pump pressure P6 and to control the pump actuator 1164 to cause the pump 1162 to increase, decrease, or maintain the pump pressure P6. In some examples, the controller 1168 can be in wireless communication with the booster system 1160. In some examples, the controller 1168 can be configured to receive a user input that can set a desired pump pressure P6. In some examples, the booster system 1160 can further include a second pressure transmitter (not shown) that can be in electronic communication with the controller 1168 and configured to sense the process pressure P1 (i.e., an input pressure of the pump 1162). In some such examples, the controller 1168 can be configured to automatically adjust the pump pressure P6 based on signals received from the first pressure transmitter 1166 and the second pressure transmitter.

With continued reference to FIG. 8, the pump 1162 of the booster system 1160 is in fluid communication with each of: the third inter-packing volume 1042*c* via a third, lower bonnet port 1076*c*; the process pressure P1 via the first process passageway 1078*a*; and a first variable volume tailspace 1126*a* of the first canister 1100*a*. In other words, the first process passageway 1078*a* is in fluid communication with both the first variable volume tailspace 1126*a* of the first canister 1100*a* and the pump 1162, although other configurations are possible. In the illustrated example, the pump 1162 is in fluid communication with an air supply (not shown) that drives the pump 1162 with the pump actuator 1164 therebetween. Thus, the pump pressure P6 of the pump 1162 can be controlled relative to the process pressure P1 via the pump actuator 1164. As mentioned above, the pump pressure P6 is provided to the third inter-packing volume 1042*c* via the third bonnet port 1076*c* and is thus trapped within the third inter-packing volume 1042*c* by the first and fourth packing sets 1038, 1084. Accordingly, in some examples, the pump pressure P6 provided by the pump 1162 can be selectable by a user via the controller 1168 that controls the pump actuator 1164 and/or by selection of a piston spring of the pump 1162.

Figure 9:
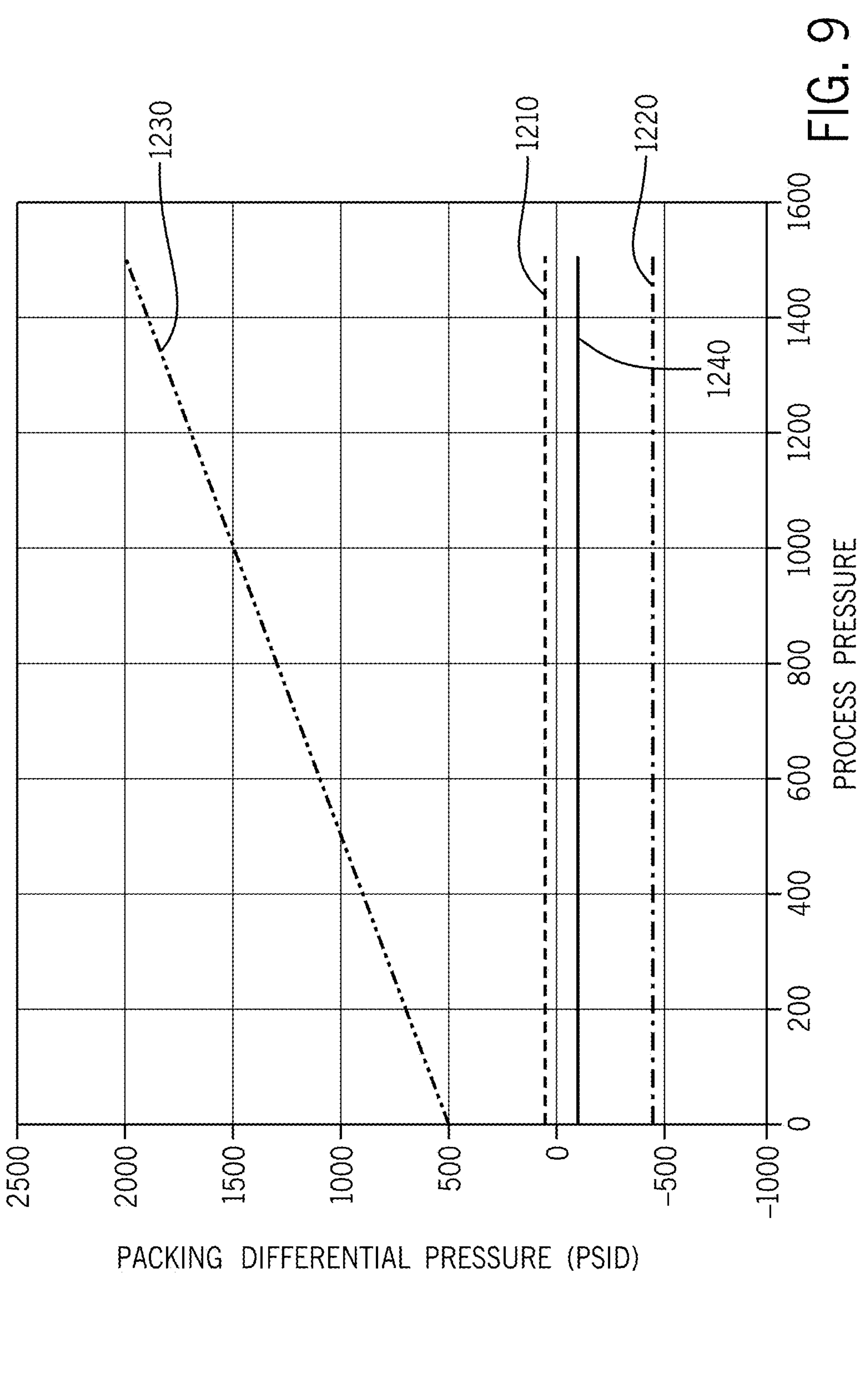
FIG. 9 is a graph showing a relationship between a process pressure and first, second, third, and fourth packing differential pressures of the valve assembly configuration of FIG. 8.

It should be appreciated that the packing system 1032 can provide further reduction or even entirely prevent process contamination resulting from leakage of barrier lubricant L from the second inter-packing volume 1042*b* into the valve flow passage 114 of the valve body 104 (see FIG. 1). In this regard, FIG. 9 is a graph 1200 that shows packing differential pressures as a function of a process pressure within the valve flow passage 114 of the valve body 104 (see FIG. 1) of the valve assembly 100 having the packing system 1032. The graph 1200 of FIG. 9 corresponding to the packing system 1032 is similar to the graphs 300, 600, 900 of FIGS. 3, 5, and 7 corresponding to the packing systems 132, 432, 732, respectively. In particular, like the graphs 300, 600, 900, the graph 1200 includes a first line 1210 corresponding to a first packing differential pressure ($\Delta P_1$) through the first packing set 1038 (i.e., between the first and third inter-packing volumes 1042*a*, 1042*c*), a second line 1220 corresponding to a second packing differential pressure ($\Delta P_2$) through the second packing set 1040 (i.e., between the first and second inter-packing volumes 1042*a*, 1042*b*), a third line 1230 corresponding to a third packing differential pressure ($\Delta P_3$) through the third packing set 1082 (i.e., between the second inter-packing volume 1042*b* and atmosphere), and a fourth line 1240 corresponding to a fourth packing differential pressure ($\Delta P_4$) through the fourth packing set 1084 (i.e., between the process pressure P1 and the third inter-packing volume 1042*c*) of the packing system 1032 of the valve assembly 100.

In this particular example, the valve assembly 100 has a maximum process pressure P1 of 1,500 psi, the first canister 1100*a* of the packing system 1032 is configured to maintain a minimum first fluid barrier pressure P4 of 25 psi (via a first piston spring 1116*a*) within the first inter-packing volume 1042*a*, the second canister 1100*b* of the packing system 1032 is configured to maintain a minimum second fluid barrier pressure P5 of 500 psi (via a second piston spring 1116*b*) within the second inter-packing volume 1042*b*, and the booster system 1160 of the packing system 1032 is configured to maintain a minimum pump pressure P6 that is 25 psi greater than any given process pressure P1 (via the pump 1162) within the third-inter-packing volume 1042*c*. In other words, the first and second canisters 1100*a*, 1100*b* are configured to provide fluid barrier pressures P4, P5, respectively, that track any changes in the process pressure P1 within a predetermined, relatively small margin during operation of the valve assembly 100 while the booster system 1160 is configured to provide the pump pressure P6 that is boosted relative to the variable process pressure P1 in order to provide the benefits discussed below.

As shown in the graph 1200 of FIG. 9, when the process pressure P1 is 0 psi, the first packing differential pressure $\Delta P_1$ through the first packing set 1038 is 25 psi, the second packing differential pressure $\Delta P_2$ through the second packing set 1040 is −475 psi, the third packing differential pressure $\Delta P_3$ through the third packing set 1082 is 500 psi, and the fourth packing differential pressure $\Delta P_4$ through the fourth packing set 1084 is −50 psi. Similar to the packing system 732 of FIG. 6, the packing system 1032 is configured such that the third packing differential pressure $\Delta P_3$ has a positive correlation with the process pressure P1. In addition, the third packing differential pressure $\Delta P_3$ has a constant offset of 500 psi (i.e., the minimum second fluid barrier pressure P5 provided by the second piston spring 1116*b*) relative to the process pressure P1 at any given time. For example, when the process pressure is at 800 psi the third packing differential $\Delta P_3$ is 1,300, and when the process pressure P1 is at the maximum of 1,500 psi the third packing differential $\Delta P_3$ is 2,000 psi. Further, because the first fluid barrier pressure P4 is maintained at the constant offset of 25 psi relative to the process pressure P1 (e.g., via the first piston spring 1116*a*), the second fluid barrier pressure P5 is maintained at the constant offset of 500 psi relative to the process pressure P1 (e.g., via the second piston spring 1116*b*), and the pump pressure P6 within the third inter-packing volume 1042*c* is maintained at the constant offset of 50 psi relative to the process pressure P1 (e.g., via the booster system 1160), the first packing differential $\Delta P_1$ is maintained at 25 psi, the second packing differential $\Delta P_2$ is maintained at −475 psi, and the fourth packing differential $\Delta P_4$ is maintained at −50 psi for any given process pressure P1 between 0 psi and 1,500 psi.

Referring again to FIG. 8, with the first fluid barrier pressure P4 being controlled via the first canister 1100*a* to always be lower than the pump pressure P6 (i.e., P4<P6) within the third inter-packing volume 1042*c* controlled by the booster system 1160, barrier lubricant L within the first inter-packing volume 1042*a* cannot leak upstream along the leakage flow path 180 (see FIG. 1) into the third inter-packing volume 1042*c*. Further, with the pump pressure P6 within the third inter-packing volume 1042*c* being greater than any given process pressure P1 (i.e., P6>P1), any potential leakage of process fluid across the fourth packing set 1084 flows upstream along the leakage flow path 180 (see FIG. 1). Generally, any such leakage can also be promptly pumped back into the third inter-packing volume 1042*c* via the pump 1162. In other words, the likelihood of leakage past the fourth packing set 1084 to atmosphere along the leakage flow path 180 is greatly reduced or even eliminated, while leakage of barrier lubricant L into the process flow is also avoided. Moreover, because the pump 1162 may generally operate only as needed to restore the pressure P6 (i.e., in response to leakage from the third inter-packing volume 1042*c* as determined by the controller 1168), monitoring of a duty cycle of the pump 1162 (e.g., in the controller 1168) can indicate that the fourth packing set 1084 is worn and that the packing system 1032 may need to be serviced or replaced.

With continued reference to FIG. 8, any leakage of process fluid within the third inter-packing volume 1042*c* past the first packing set 1038 into the first inter-packing volume 1042*a* may increase the volume of fluid within the first canister 1100*a*. Further, as the second packing set 1040 wears, barrier lubricant L within the second inter-packing volume 1042*b* can leak upstream along the leakage flow path 180 (see FIG. 1) into the first inter-packing volume 1042*a* and can also increase the volume of fluid within the first canister 1100*a*. Accordingly, in some examples, the first canister 1100*a* can include a visual indicator (not shown), as discussed above, to indicate potential need for maintenance for the packing system 1032. In some such examples, a visual indicator of the first canister 1100*a* can indicate failure of one or both of: (i) the first packing set 1038 that results in excess process fluid in the first canister 1100*a*; or (ii) the second packing set 1040 that results in excess barrier lubricant L in the first canister 1100*a*. Thus, regardless of whether the first or second packing set 1038, 1040 has failed, the visual indicator of the first canister 1100*a* can indicate that the packing system 1032 needs serviced or replaced. In some examples, the first canister 1100*a* can include a canister sensor (not shown) that can be configured to sense the volume of fluid within the first canister 1100*a* and to send electrical signals to a packing monitoring system (not shown) corresponding to the sensed volume of fluid.

Thus, it should be appreciated that, in addition to generally providing increased sealing performance and lifespan of a packing system of a valve assembly, including as discussed above with reference to FIGS. 1-9, examples of the present disclosure can facilitate improved monitoring of valve assemblies, including to determine the current sealing effectiveness of a packing system and pre-emptively identify potential failures of the packing system. In some examples, valve assemblies disclosed herein can allow the sealing effectiveness of a packing system to be tracked over an extended period, including to help predict when the packing system may fail and to proactively service or replace the packing system. For example, in some examples, a packing system can include a packing monitoring system that can be configured to both actively manage inter-packing pressures of the packing system and monitor the health of the packing system. In some such examples, the packing monitoring system can include a sensor arrangement configured to sense a flow of fluid to a bonnet port in a bonnet of the valve assembly and a control system configured to determine a leakage of barrier lubricant of one or more inter-packing volumes of the packing system. In some such examples, the packing monitoring system can be external to the valve assembly and can interface with the bonnet of the valve assembly using tubing and fittings.

As discussed above, aspects of the present disclosure can include methods for retrofitting an existing valve assembly with a packing system that is configured to maintain one or more fluid barrier pressures (and/or a pump pressure) within one or more inter-packing volumes of the packing system. For example, referring specifically to the packing systems 732, 1032 of FIGS. 6 and 8, respectively, in some cases an existing lubrication port of a bonnet of an existing valve assembly can be utilized as a bonnet port (e.g., one of bonnet ports 776*a*, 776*b*, 1076*a*, 1076*b*, 1076*c*). Thus, in such examples, a valve assembly can be retrofitted to have a pressurized barrier lubricant within an inter-packing volume by placing a pressure reservoir (e.g., canister 800*a*, 800*b*, 1100*a*, 1100*b*) in fluid communication with the lubrication port or to have an elevated process pressure (e.g., pump pressure P6) within an inter-packing volume by placing a pump (e.g., pump 1162 of booster system 1160) in fluid communication with the lubrication port. In other examples, one or more bonnet ports can be drilled into an existing bonnet of the valve assembly. Further, in some examples, a process passageway (e.g., one or both of process passageways 778*a*, 778*b*, 1078*a*, 1078*b*) can be drilled into an existing bonnet of the valve assembly.

While the example packing arrangements have been described in connection with a control valve, the scope of the present disclosure is not limited to this implementation. A wide variety of devices that include a sealed movable operating member that provides a leakage path (e.g., a rotating or sliding shaft) can be improved by the packing arrangement of the present disclosure. As one particular example, in some implementations, the packaging arrangement of the present disclosure can be included as a sealing arrangement in a rotary machine (such as, e.g., a rotary-screw compressor) to provide a seal between a shaft configured to rotate one or more rotary elements and an ambient environment to prevent fugitive emissions of fluid (e.g., gas) from the shaft bore.

In some examples, aspects of the disclosed technology, including computerized implementations of methods according to the present disclosure, can be implemented as a system, method, apparatus, or article of manufacture using standard programming or engineering techniques to produce software, firmware, hardware, or any combination thereof to control a control device such as a processor device, a computer (e.g., a processor device operatively coupled to a memory), or another electronically operated controller to implement aspects detailed herein. Accordingly, for example, aspects of the present disclosure can be implemented as a set of instructions, tangibly embodied on a non-transitory computer-readable media, such that a processor device can implement the instructions based upon reading the instructions from the computer-readable media. Some implementations of the disclosed technology can include (or utilize) a control device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the present disclosure, or of systems executing those methods, may be represented schematically in the Figures or otherwise discussed herein. Unless otherwise specified or limited, representation in the Figures of particular operations in particular spatial order may not necessarily require those operations to be executed in a particular sequence corresponding to the particular spatial order. Correspondingly, certain operations represented in the Figures, or otherwise disclosed herein, can be executed in different orders than are expressly illustrated or described, as appropriate for particular implementations of the disclosed technology. Further, in some implementations, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, "leakage rate" and variations thereof is meant to refer to a mass flow rate of leakage from an inlet of the valve assembly along a path to an ambient area, particularly through a packing system or portion thereof. For example, a "leakage rate" can refer to a collective mass flow rate of leakage through two (or more) packing arrangements of a packing system that are arranged in series along a common leakage path from the inlet of the valve assembly to an ambient area. Thus, a packing system with a "higher leakage rate" and variations thereof generally permits a higher rate of mass flow from a valve inlet through the packing system than does a packing system with a "lower leakage rate." Similarly, for example, a "first leakage rate" can refer to a first mass flow rate of leakage through a first packing set of a packing system, a "second leakage rate" can refer to a second mass flow rate of leakage through a second packing set of the packing system that is arranged in series along the common leakage path of the packing system, and a collective "leakage rate" of the packing system can refer to the collective mass flow rate of leakage through the first and second packing sets of the packing system. Thus, a first packing set can have a "first leakage rate" that is different than a "second leakage rate" of a second packing set. In addition, the use of "fugitive emissions" and variations thereof herein is meant to refer to leakage from the packing system to the atmosphere surrounding the valve assembly.

As described herein, examples of the disclosed technology can provide a packing system of a valve assembly having, among others, improved sealing performance. The previous description of the exemplary implementations is provided to enable any person skilled in the art to make or use the disclosed technology. Various modifications to these exemplary implementations will be readily apparent to those skilled in the art, and the generic principles defined herein may be applied to other implementations without departing from the spirit or scope of the present disclosure. Thus, the present disclosure is not intended to be limited to the examples shown herein but is to be accorded the widest scope consistent with the principles and novel features disclosed herein.

The invention claimed is:

1. A valve assembly comprising:

a valve body defining a flow passage;

a stem received in a stem bore to control flow through the flow passage;

a bonnet; and a packing system that includes:

a first packing set in the stem bore about a first portion of the stem and compressed to provide a first pressure drop along a leakage flow path from the flow passage through the stem bore, the first packing set surrounding the stem within the bonnet;

a second packing set in the stem bore about a second portion of the stem, the second packing set spaced apart from the first packing set relative to the leakage flow path to provide a first inter-packing volume between the first packing set and the second packing set, and compressed to provide a second pressure drop along the leakage flow path different than the first pressure drop; and, the second packing set surrounding the stem within the bonnet;

a first pressurized barrier lubricant reservoir providing pressurized barrier lubricant to a first pressure within the first inter-packing volume through a first bonnet port of the bonnet;

a third packing set arranged in the stem bore to surround a third portion of the stem and spaced apart from the second packing set to define a second inter-packing volume within the stem bore, with the second packing set between the first packing set and the third packing set; and a second pressurized barrier lubricant reservoir in fluid communication with the second inter-packing volume via a second bonnet port in the bonnet to pressurize barrier lubricant within the second inter-packing volume.

2. The valve assembly of claim 1, wherein the pressurized barrier lubricant reservoir is arranged to sense a process pressure at a location that is upstream of the first packing set, relative to a leakage flow path from the flow passage through the stem bore, to pressurize the barrier lubricant.

3. The valve assembly of claim 2, wherein the first pressurized barrier lubricant reservoir includes a spring-biased piston arranged to compress a barrier lubricant chamber, an outlet port arranged to connect the barrier lubricant chamber to the first bonnet port, and a process port plumbed to the process pressure to assist the spring-biased piston, with the process port fluidically isolated from the barrier lubricant chamber.

4. The valve assembly of claim 1, wherein the second pressurized barrier lubricant reservoir is arranged to sense a process pressure upstream of the first packing set, relative to a leakage flow path from the flow passage through the stem bore, to pressurize barrier lubricant within the second pressurized barrier lubricant reservoir.

5. The valve assembly of claim 1, wherein the packing system further includes:

a fourth packing set arranged in the stem bore to surround a fourth portion of the stem and spaced apart from the first packing set to define a third inter-packing volume within the stem bore, with the fourth packing set between the first packing set and the valve body; and a booster system arranged to pressurize process fluid from upstream of the fourth packing set, relative to a leakage flow path from the flow passage through the stem bore, and to provide pressurized process fluid to the third inter-packing volume via a third bonnet port in the bonnet.

6. The valve assembly of claim 1, wherein the packing system further includes:

an additional packing set arranged in the stem bore to surround an additional portion of the stem and spaced apart from the first packing set to define a third inter-packing volume within the stem bore, with the additional packing set between the first packing set and the valve body; and a booster system arranged to pressurize process fluid from upstream of the additional packing set, relative to a leakage flow path from the flow passage through the stem bore, and to provide pressurized process fluid to the third inter-packing volume.

7. The valve assembly of claim 1, further comprising:

a sensor arrangement configured to sense a flow of barrier lubricant to the first bonnet port; and a control system configured to determine a leakage of barrier lubricant out of the first inter-packing volume.

8. The valve assembly of claim 1, wherein the second packing set is downstream of the first packing set relative to the leakage flow path, and wherein the second pressure drop along the leakage flow path is larger than the first pressure drop along the leakage flow path from the flow passage thorough the stem bore.

9. A method of installing a packing system, the method comprising:

providing a valve assembly that includes a valve body having an inlet, an outlet, and a flow passage extending between the inlet and the outlet, and a bonnet mounted to the valve body, the bonnet having a stem bore that receives a valve stem to control flow through the flow passage;

connecting a first pressurized barrier lubricant reservoir to pressurize barrier lubricant to a first pressure within a first inter-packing volume of the valve assembly through a first bonnet port of the bonnet, the first inter-packing volume being provided between a first packing set installed about a first portion of the stem and a second packing set installed about a second portion of the stem, the first and second packing sets surrounding the stem within the bonnet, spaced apart from the first packing set relative to a leakage flow path from the flow passage through the stem bore;

arranging a third packing set in the stem bore to surround a third portion of the stem and spaced apart from the second packing set to define a second inter-packing volume within the stem bore, with the second packing set between the first packing set and the third packing set;

connecting a second pressurized barrier lubricant reservoir in fluid communication with the second inter-packing volume via a second bonnet port in the bonnet to pressurize barrier lubricant within the second inter-packing volume;

compressing the first packing set to provide a first pressure drop along the leakage flow path; and compressing the second packing set to provide a second pressure drop along the leakage flow path.

* * * * *